United States Patent
Mayuzumi et al.

(10) Patent No.: US 7,340,383 B2
(45) Date of Patent: Mar. 4, 2008

(54) CONTROL DEVICE, METHOD AND COMPUTER PROGRAM PRODUCT FOR BROWSING DATA

(75) Inventors: Takane Mayuzumi, Kanagawa (JP); Hideki Tamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 642 days.

(21) Appl. No.: 10/324,061

(22) Filed: Dec. 20, 2002

(65) Prior Publication Data

US 2004/0002841 A1    Jan. 1, 2004

(30) Foreign Application Priority Data

Dec. 20, 2001   (JP) .............................. 2001-387435
Dec. 20, 2001   (JP) .............................. 2001-387448
Dec. 20, 2001   (JP) .............................. 2001-387466

(51) Int. Cl.
   *G06F 7/48*   (2006.01)
(52) U.S. Cl. .................. 703/7; 715/513; 345/853; 345/419; 345/415; 705/4; 705/1
(58) Field of Classification Search .............. 703/24, 703/1; 715/513; 705/4, 1; 345/853, 419, 345/418; 264/40.1; 700/182, 200, 179, 700/165; 707/1; 409/96; 358/1.9
See application file for complete search history.

(56) References Cited

U.S. PATENT DOCUMENTS

| | | | |
|---|---|---|---|
| 5,402,351 A * | 3/1995 | Batchelder et al. | 700/119 |
| 5,822,450 A * | 10/1998 | Arakawa et al. | 382/152 |
| 6,185,476 B1 * | 2/2001 | Sakai | 700/182 |
| 6,215,493 B1 * | 4/2001 | Fujita | 345/418 |
| 6,260,000 B1 * | 7/2001 | Karasaki et al. | 702/155 |
| 7,075,531 B1 * | 7/2006 | Ando et al. | 345/420 |
| 2001/0037190 A1 * | 11/2001 | Jung | 703/1 |
| 2002/0038163 A1 * | 3/2002 | Hazama | 700/165 |

(Continued)

FOREIGN PATENT DOCUMENTS

JP         11-203366 A        7/1999

(Continued)

OTHER PUBLICATIONS

Marsan et al., "An assessment of data requirements and data transfer formats for layered manufacturing", National Institute of Standards and Technology, Gaithersburg, MD 20899, USA.*

(Continued)

*Primary Examiner*—K. Thangavelu
(74) *Attorney, Agent, or Firm*—Morrison & Foerster LLP

(57) ABSTRACT

A conversion processing method, device and computer program product. The device includes a memory for storing drafting data, a selector for choosing the drafting data stored in the memory, a converter for converting the drafting data chosen by the selector into shape data, and a transmitter for transmitting the shape data to a browsing management server that stores the shape data and enables browsing the shape data via a communications network. The converter converts, from drafting data selected by the selector, the drafting data having a registration date and time corresponding to the date on which the converter has converted the drafting data, and that is also more recent than the registration date on which the drafting data is registered in the memory.

17 Claims, 24 Drawing Sheets

U.S. PATENT DOCUMENTS

| | | | |
|---|---|---|---|
| 2002/0080194 A1* | 6/2002 | Fujieda | 345/853 |
| 2002/0085219 A1* | 7/2002 | Ramamoorthy | 358/1.9 |
| 2002/0089499 A1* | 7/2002 | Lee et al. | 345/419 |
| 2002/0095236 A1* | 7/2002 | Dundorf | 700/182 |
| 2002/0113331 A1* | 8/2002 | Zhang et al. | 264/40.1 |
| 2002/0128744 A1* | 9/2002 | Nishiyama et al. | 700/200 |
| 2002/0129001 A1* | 9/2002 | Levkoff et al. | 707/1 |
| 2002/0145213 A1* | 10/2002 | Liu et al. | 264/40.1 |
| 2002/0161608 A1* | 10/2002 | Loveland | 705/4 |
| 2003/0123943 A1* | 7/2003 | Hamada | 409/96 |
| 2003/0171841 A1* | 9/2003 | Porter et al. | 700/179 |
| 2004/0015367 A1* | 1/2004 | Nicastro et al. | 705/1 |
| 2004/0225958 A1* | 11/2004 | Halpert et al. | 715/513 |

FOREIGN PATENT DOCUMENTS

| | | |
|---|---|---|
| JP | 11-249945 A | 9/1999 |
| JP | 2001-202427 A | 7/2001 |
| JP | 2001-312527 A | 11/2001 |

OTHER PUBLICATIONS

Japanese Notification of Reason for Refusal (w/ English translation) mailed on Jul. 25, 2006 for Japanese Patent Application No. JP-2001-387435 filed on Dec. 20, 2001, 4 pages.

* cited by examiner

FIG.17

USER ID

PASSWORD

CONTROL DEVICE, METHOD AND COMPUTER PROGRAM PRODUCT FOR BROWSING DATA

BACKGROUND OF THE INVENTION

1. Field of the Invention

This invention relates to a control device, method and computer program product for browsing data in order to share information efficiently about articles designed using 3-D CAD (Computer Aided Design) system.

2. Description of the Related Art

It is thought to design image-creating devices such as photocopiers, facsimiles, and printers by using 3-D CAD systems, and to share the design information among multiple users. In this case, the data sizes of the design information made by 3-D CAD systems often become as large as a few hundred MB. On the other hand, in design section, it is demanded to efficiently share design information, in order to make it easy for managers to check information in progress, or in order to use data of related products, units, and components made by other design sections. In addition, in service and sales departments, the sharing of design information is also demanded to make it easy to check the shape of products, units, and components.

So far, however, the sharing of design information with large amount of data has been difficult because of restrictions on many aspects such as the rate of data transfer in network, the capacity of storage, and the performance of computers that each user uses.

One way to efficiently share design information is reducing the size of data made by 3-D CAD systems. In this case, the way of relating various kinds of design information is important to efficiently use the shared information.

The present invention has been made in consideration of the above. The present invention relates to a control device for sharing information converted from design information made by 3-D CAD systems. The device enables the shared information to be used more efficiently.

SUMMARY OF THE INVENTION

The invention relates to a conversion processing method, device and computer program product. In a preferred embodiment the device includes a memory for storing drafting data, a selector for choosing the drafting data stored in the memory, a converter for converting the drafting data chosen by the selector into shape data, and a transmitter for transmitting the shape data to a browsing management server that stores the shape data and enables browsing the shape data via a communications network. The converter converts, from drafting data selected by the selector, the drafting data having a date and time of registration on which the converter has converted the drafting data that is more recent than the registration date on which the drafting data is registered in the memory.

In one embodiment the drafting data is 3-Dimensional computer aided design data, and the shape data is 3-Dimensional shape data showing parts of a product.

In one embodiment the selector selects the drafting data using recognition information including parts-numbers. The parts-number may be associated with, for example: parts under design, other parts to use in the parts under design, the other parts already having been designed prior to the designing of the parts under design, a unit or a product for which the parts under design and the other parts are used.

In one embodiment the selector has a receiving unit to receive the drafting data which the converter converts into the shape data from the browsing management server.

In one embodiment the recognition information includes the parts number of the shape data for the unit or product, and designer's name of the shape data.

In one embodiment the management server determines whether or not to permit browsing of drafting data via the communications network based on access rights provided for each user in advance. When determining to permit browsing, the parts number and the designer's name of the drafting data may be deleted to enable browsing of drafting data by the client terminal.

BRIEF DESCRIPTION OF THE DRAWINGS

These objects and other objects and advantages of the present invention will become more apparent upon reading the following detailed description and the accompanying drawings in which:

FIG. 17 shows a screen to enter information required to access the browsing system.

FIG. 18 shows an example of the attribute information browser.

DETAILED DESCRIPTION OF THE PREFERRED EMBODIMENT

Figure 1:
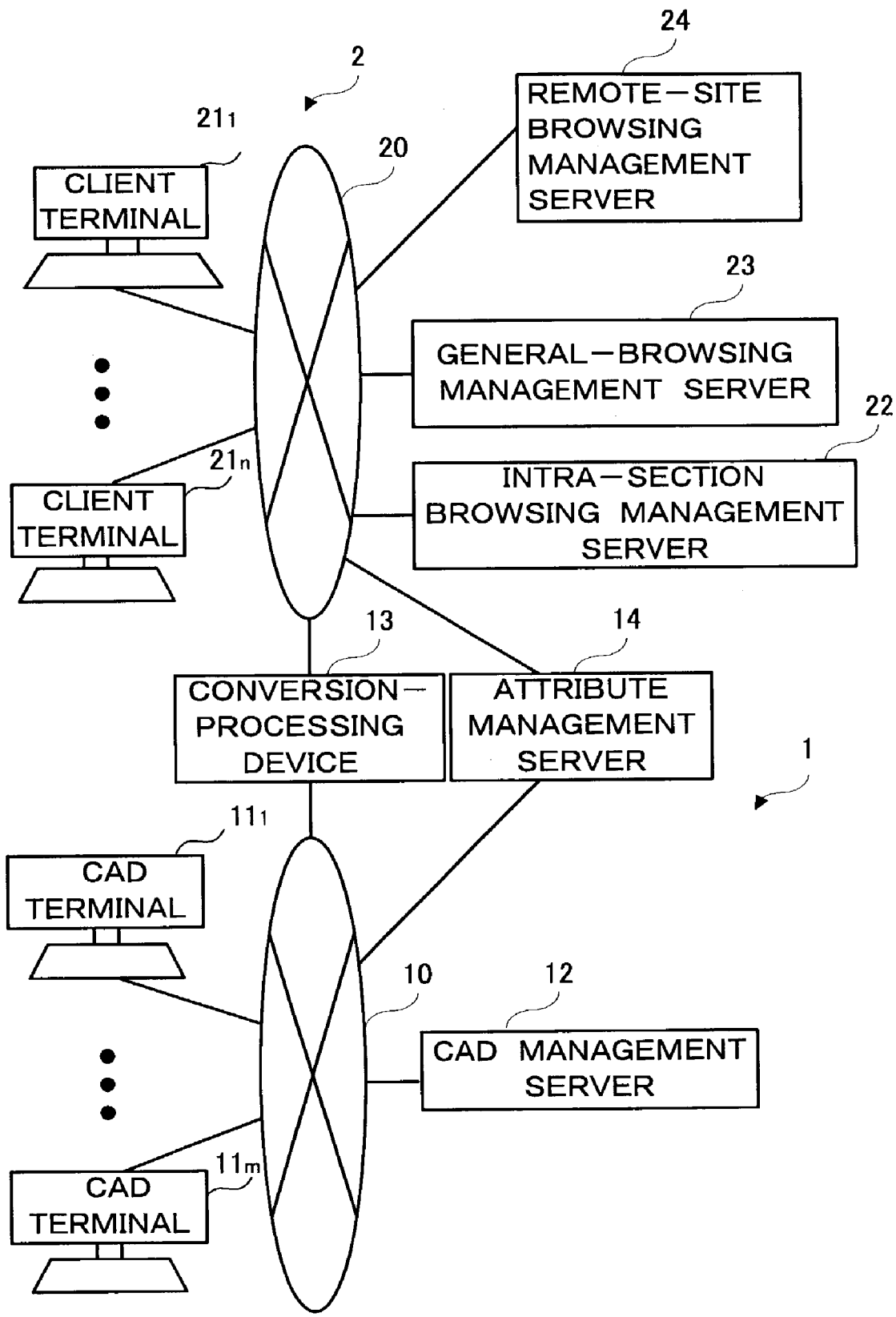
FIG. 1 shows the structure of the network system for a preferred embodiment of the present invention.

Details of an embodiment of the present invention will be described below using attached figures. FIG. 1 shows a schematic diagram of the network system structure for the embodiment of the present invention. As shown in FIG. 1, the system has of 3-D CAD system 1 and information-browsing system 2.

The 3-D CAD system 1 includes, for example, intranets using LAN and WAN installed in design sections of companies or organizations that take charge of designing of components. The system has CAD terminals 11 ($11_1$~$11_m$), a CAD management server 12, a conversion-processing device 13, and an attribute management server 14. All of these equipments are connected with each other via a network 10.

Figure 2:
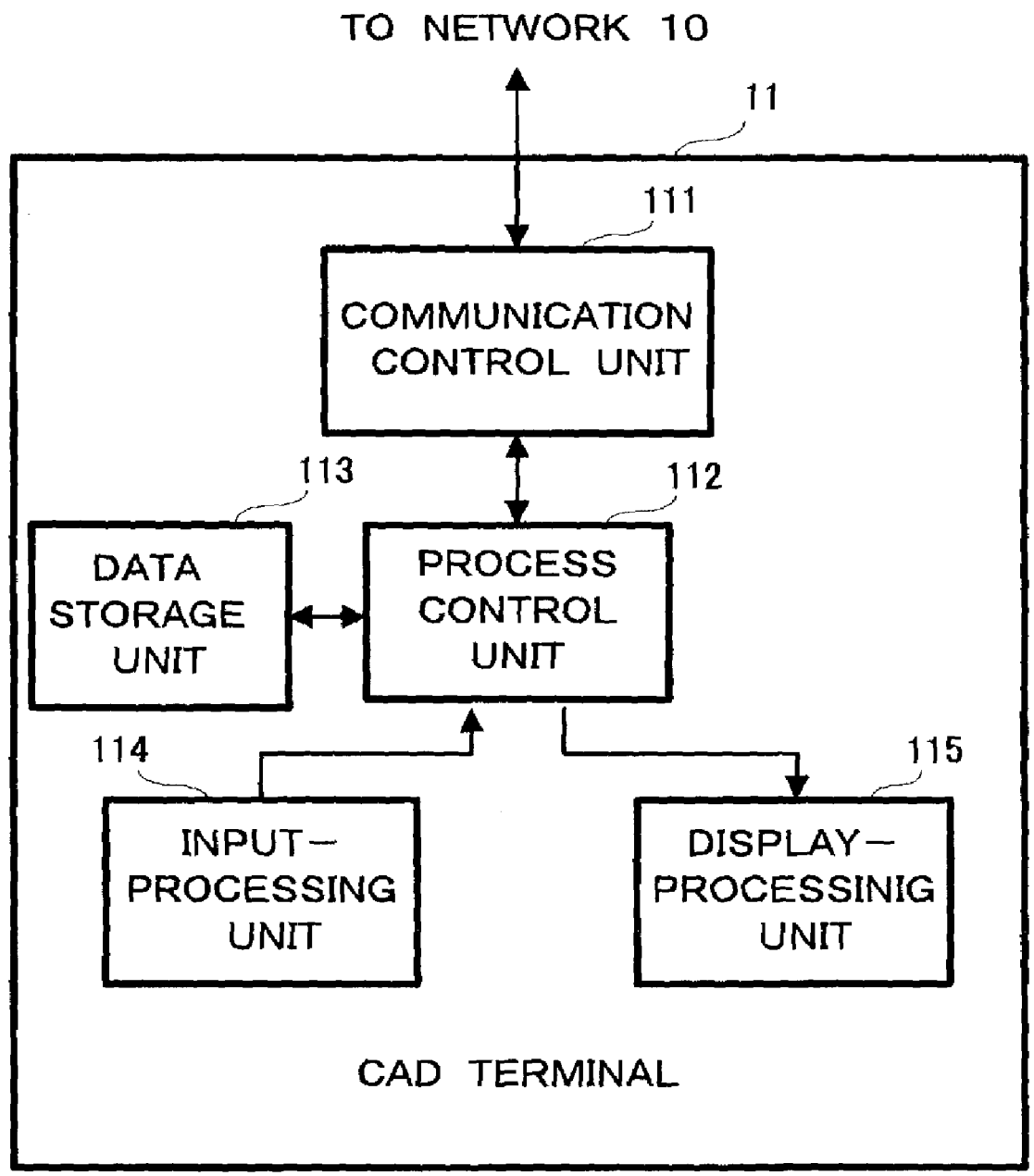
FIG. 2 shows the structure of the. CAD terminal.

The CAD terminal 11 has e.g. workstations that are installed in each design section, and is used for designing components of image-creating devices such as photocopiers, facsimiles, and printers. The CAD terminal 11 includes a communication control unit 111, a process control unit 112, a data storage unit 113, an input-processing unit 114, and display-processing unit 115, as shown for instance in FIG. 2.

The communication control unit 111 transmits and receives various kinds of information via the network 10, being controlled by the process control unit 112.

The process control unit 112 makes image information about shape of components under design, according to commands inputted from input-processing unit 114. It then sends the image information to the display-processing unit 115, enabling users to create 3-D CAD data. The process control unit 112 also communicates with other equipments via the communication control unit 111, controlling the processes of sending and receiving data such as the created 3-D CAD data.

The data storage unit 113 has storages such as semiconductor memories and magnetic disks, and it stores various kinds of information and programs.

The input-processing unit 114 has devices such as keyboards and pointing devices, and it is used for inputting commands and data.

The display-processing unit 115 has devices such as displays and video memories, and it outputs information about design components such as 3-D shapes and attribute information, by displaying screens corresponding to the image information received from the process control unit 112.

Figure 3:
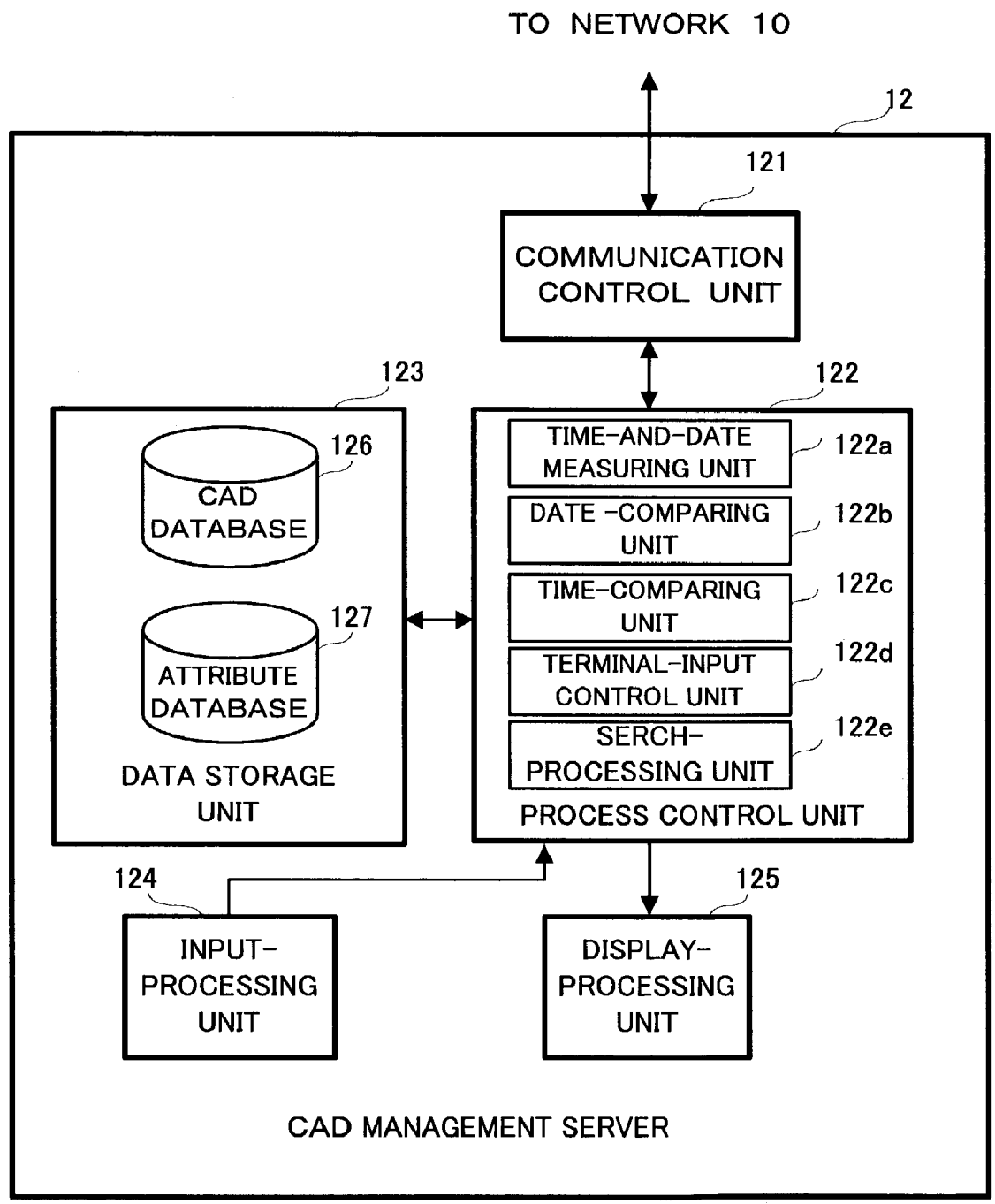
FIG. 3 shows the structure of the CAD management server.

The CAD management server 12 shown in FIG. 1 is a computer system for management of 3-D CAD data created in the 3-D CAD system 1. As shown in FIG. 3, the CAD management server 12 is equipped with, for example, a communication control unit 121, a process control unit 122A data storage unit 123, an input-processing unit 124, and a display-processing unit 125. Basically, each of the units 121~125 mentioned above is similar to their counterparts in the CAD terminal 11, units 111~115. The function of each unit is, however, specially designed for management of information such as 3-D CAD data of the 3-D CAD system 1.

For example, the data storage unit 123 has the function of storing data such as 3-D CAD data made in the 3-D CAD system 1, and it has a CAD database 126 for storing 3-D CAD data and an attribute database for storing attribute information.

The CAD database 126 stores phase information and geometric information for specifying the shape of design components. Here, the phase information has information that indicates the way of connection between points or surfaces, which shows the shape of design components. The geometric information has information, e.g., about shapes of curves and curved surfaces.

The attribute database 127 is used for storing various kinds of information relating to 3-D CAD data. For example, it stores information as the following: parts name, parts number, designer's name, version number, the registration date of 3-D CAD data, the last date of conversion to 3-D shape data, schedule to convert to 3-D shape data, the date of approval, color, volume, center of gravity, moment of inertia, precision, and the structure of assembly. The attribute database 127 stores parts numbers of other components, which is used in the component indicated by a certain 3-D CAD data and the design work of which have been finished. When stored, these parts numbers are related to the parts number of the component indicated by the 3-D CAD data concerned. In addition, the attribute database 127 stores the name of a unit or a product that uses the component indicated by the 3-D CAD data concerned, relating it to the parts number of the component.

Figure 4:
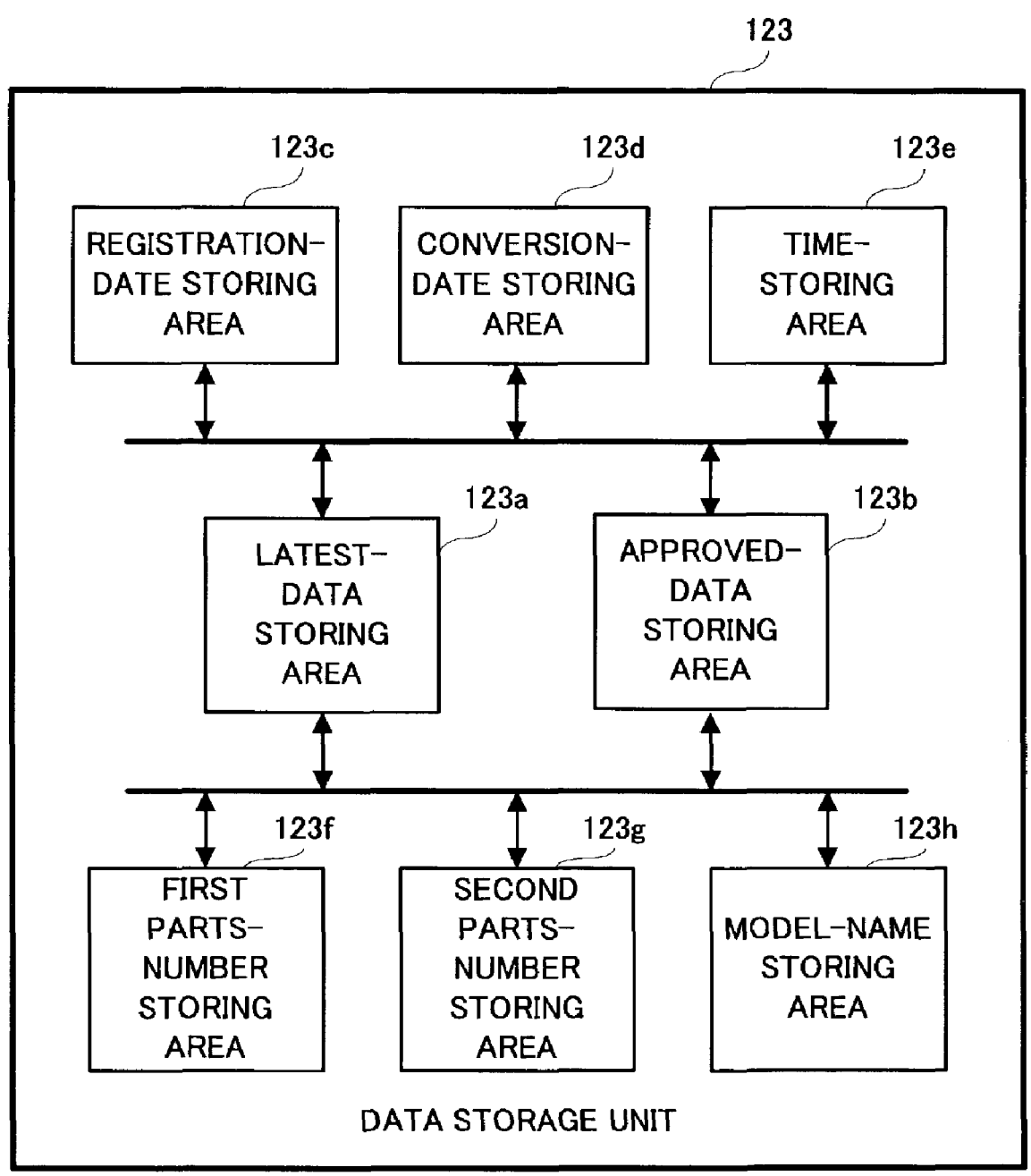
FIG. 4 shows the logical structure of the data storage unit in the CAD management server.

The data storage unit 123 stores these various kinds of information with such a logical structure shown in FIG. 4. The data storage unit 123 includes: a latest-data storing area 123A, an approved-data storing area 123B, a registration-date storing area 123C, a conversion-date storing area 123D, time-storing area 123E, the first and the second parts-number storing areas 123F and 123G, and a model-name storing area 123H.

The latest-data storing area 123A is an area for storing 3-D CAD data that have not been approved as valid data. For instance, this area stores 3-D CAD data that have no information about the date of approval. The approved-data storing area 123B is an area for storing 3-D CAD data that have been already approved as valid data and related to the information about the date of approval. The latest-data storing area 123A and the approved-data storing area 123B are realized, for example, by making folders that correspond to each area, and by storing 3-D CAD data in proper folder after classification according to the above conditions. In each folder also created are sub-folders that have the same name as the model name of a unit or a product that uses the components indicated by each 3-D CAD data, and the classified 3-D CAD data are stored in corresponding sub-folders.

The registration-date storing area 123C is an area storing the information about the date when 3-D CAD data were registered in the CAD database 126, with the information related to the corresponding 3-D CAD data. The conversion-date storing area 123D is an area storing the information about the date when the latest conversion of 3-D CAD data to 3-D shape data were carried out, with the information related to the corresponding 3-D CAD data. The time-storing area 123E is an area storing time set in advance, in order to perform conversion periodically from 3-D CAD data to 3-D shape data when the registration date of 3-D CAD data are later than the conversion date of them.

The first parts-number storing area 123F is an area storing the parts number of the component indicated by a certain 3-D CAD data, with the number related to the 3-D CAD data concerned. The second parts-number storing area 123G is an area storing parts numbers of other components, which are used in the component indicated by a certain 3-D CAD data and the design of which have already been finished. When stored in the second parts-number storing area 123G, those parts numbers are related to that of the main part of the 3-D CAD data concerned, which is stored in the first parts-number storing area 123F. The model-name storing area 123H is an area storing the name of a unit or a product that uses the component indicated by a certain 3-D CAD data, with the name related to the parts number stored in the first parts-number storing area 123F.

As shown in FIG. 3, the process control unit 122 includes the following units as logical structure: a time-and-date measuring unit 122A, a date-comparing unit 122B, a time-comparing unit 122C, a terminal-input control unit 122D, and a search-processing unit 122E.

The time-and-date measuring unit 122A includes a calendar and a clock to measure current date and time, respectively. The date-comparing unit 122B compares the date of registration stored in the registration-date storing area 123C with that of conversion stored in the conversion-date storing area 123D. In other words, the date-comparing unit 122B compares the registration date and conversion date of each 3-D CAD data, which is stored in the CAD database 126. The time-comparing unit 122C compares current time indicated by the time-and-date measuring unit 122A with the time stored in the time-storing area 123E.

The terminal-input control unit 122D makes it possible to input various kinds of information at the CAD terminal 11, by communicating with the terminal via the communication-control unit 121. For example, the terminal-input control unit 122D enables users to input a request for approval of a 3-D CAD data as valid data, which is stored in the latest-data storing area 123A. The search-processing unit 122E searches CAD database 126 for the 3-D CAD data of other components that are used in the component indicated by a 3-D CAD data, which is to be converted by the conversion-processing device 13.

Figure 5:
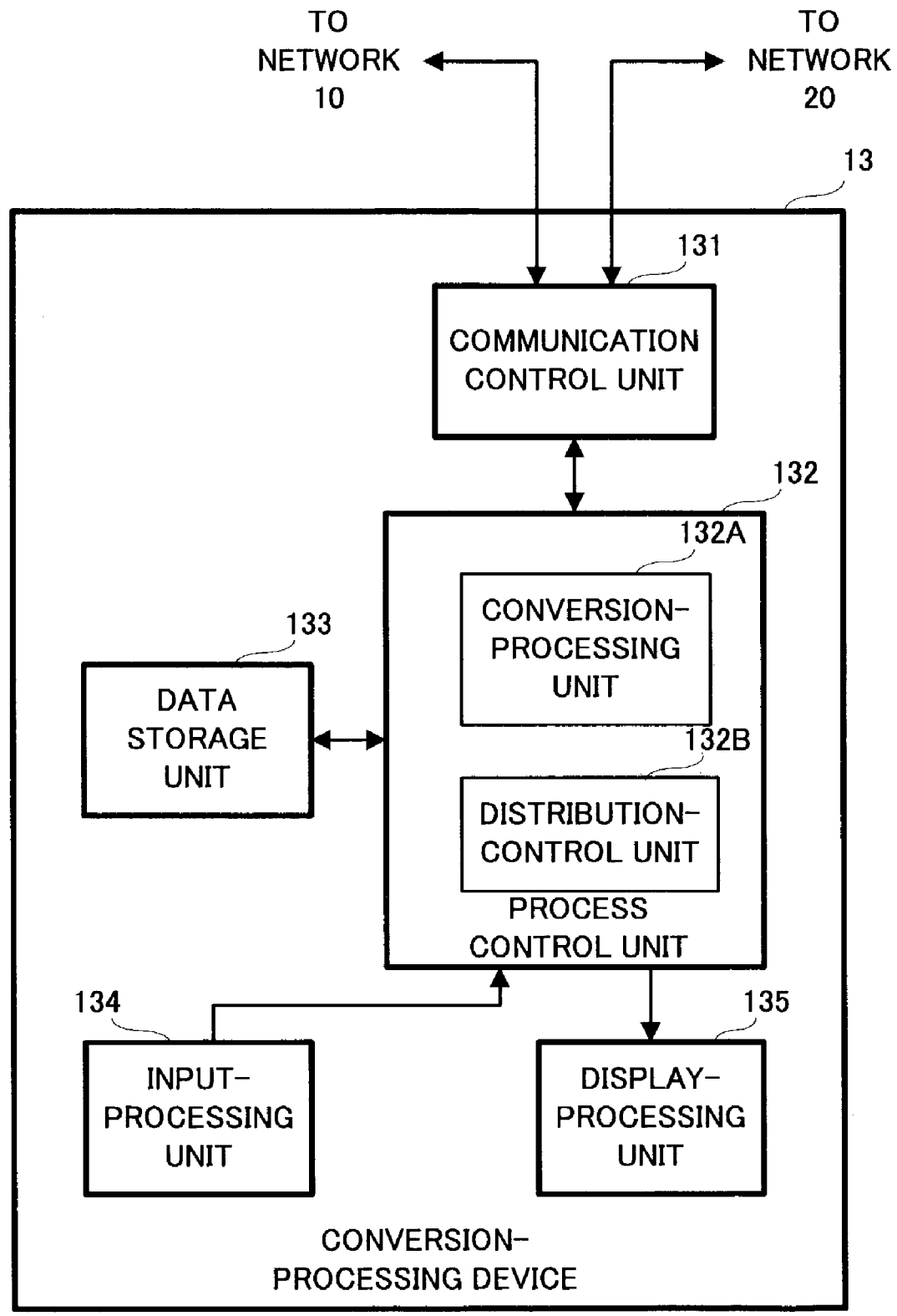
FIG. 5 shows the structure of the conversion-processing device.

The conversion-processing device in FIG. 1 is a computer system that converts the 3-D shape information made by the 3-D CAD system 1 (3-D CAD data) into another format of 3-D shape information (3-D shape data), which can be looked at by the information-browsing system 2. As shown in FIG. 5, the conversion-processing device 13 is equipped with, for example, a communication control unit 131, a process control unit 132, a data storage unit 133, an input-processing unit 134, and a display-processing unit 135. Basically, each of the units 131~135 mentioned above is similar to their counterparts in the CAD terminal 11, units 111~115. The function of each unit is, however, specially designed for conducting conversion of 3-D CAD data into 3-D shape data, and for distribution of the converted data.

For example, the communication control unit 131 receives information sent from the CAD management server 12 via the network 10, and it also sends various kinds of information including 3-D shape data to the intra-section browsing management server 22 and the remote-site browsing management server 24 via the network 20.

Besides, as shown in FIG. 5, the process control unit 132 includes a conversion-processing unit 132a and a distribution-control unit 132b as logical structure. The conversion-processing unit 132a converts 3-D CAD data into 3-D shape data. The distribution-control unit 132b specifies the destination of 3-D shape data based on the information sent from the CAD management server 12. It also distributes various kinds of information to the intra-section browsing management server 22 and the remote-site browsing management server 24 of the information-browsing system 2, and makes them store the information.

Figure 6A:
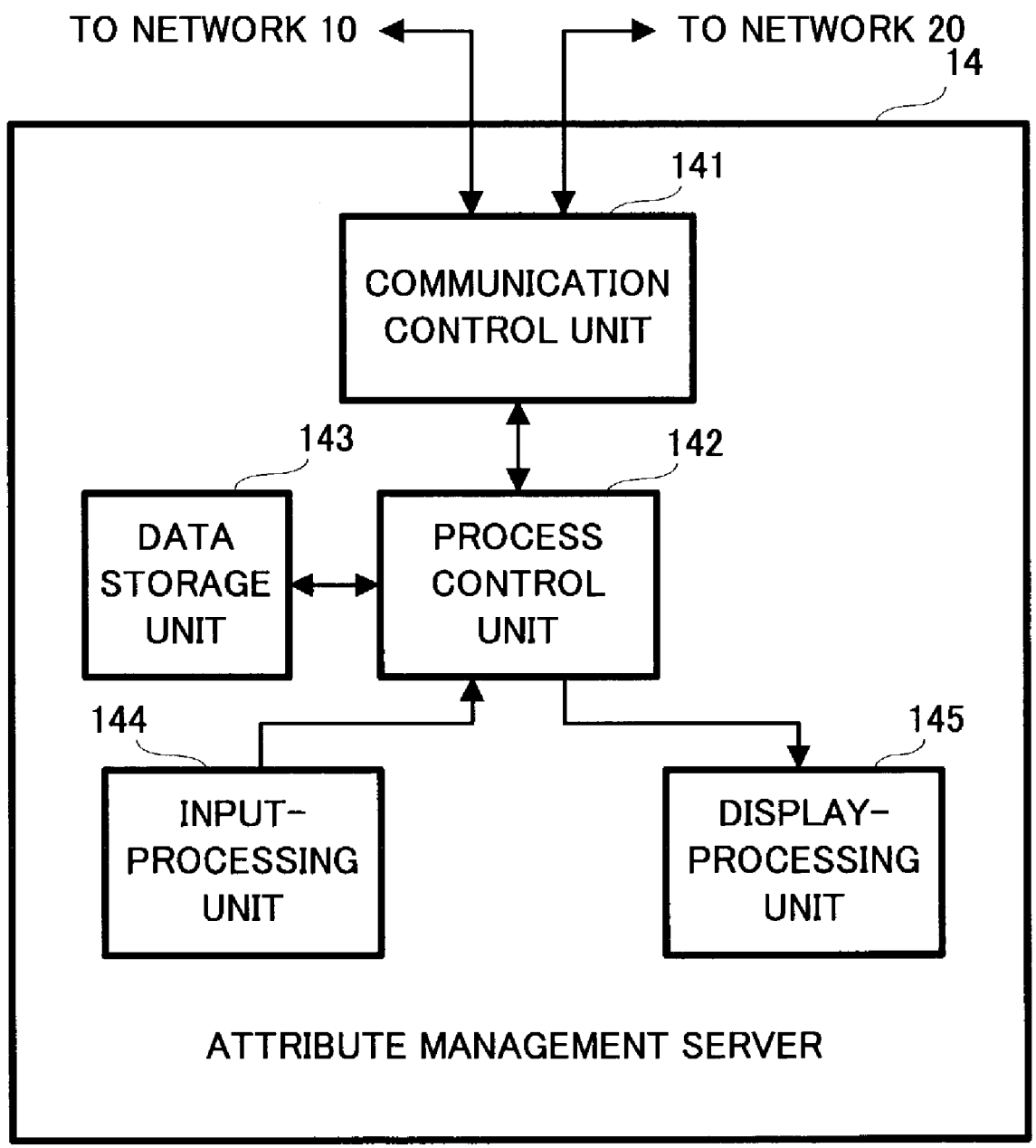
FIG. 6A shows the structure of the attribute management server, and 6B shows that of the client terminal.

The attribute management server 14 is a computer system for managing information about the attribute of the design components, which is released to the information-browsing system 2. As shown in FIG. 6A, the attribute management server 14 has, for example, a communication control unit 141, a process control unit 142, a data storage unit 143, an input-processing unit 144, and a display-processing unit 145. Basically, each of the units 141~145 mentioned above is similar to their counterparts in the CAD terminal 11, units 111~115. The function of each unit is, however, specially designed for managing the information to be released to the information-browsing system 2. For example, the attribute management server 14 has a function to manage access to the intra-section browsing management server 22 from the client terminal 21 via the network 20, by co-operating with the intra-section browsing management server 22. Here, attribute information that is released to the information-browsing system 2 includes: e.g., parts name, parts number, designer's name, version number, the date of creation, surface area, volume, center of gravity, and moment of inertia.

The attribute management server 14 stores these kinds of attribute information in the data storage unit 143, with relating the information, for example, to the parts number of the component indicated by a 3-D CAD data, which is stored in the CAD database 126 of the CAD management server 12. In addition, the data storage unit 143 stores data that have the same structure as the first and the second parts-number storing area 123F and 123G and as the model-name storing area 123H, all of which are in the CAD management server 12. When storing data, the data storage unit 143 relates them to various kinds of information. The information stored in the attribute management server 14 is also related to the 3-D shape data stored in the intra-section browsing management server 22 of the information-browsing system 2.

The information-browsing system 2 is a system for browsing information such as 3-D shape data converted from 3-D CAD data. The information-browsing system 2 includes client terminals 21 ($21_1$~$21_n$), an intra-section browsing management server 22A general-browsing management server 23 and a remote-site browsing management server 24, all of which are connected via the network 20.

Figure 6B:
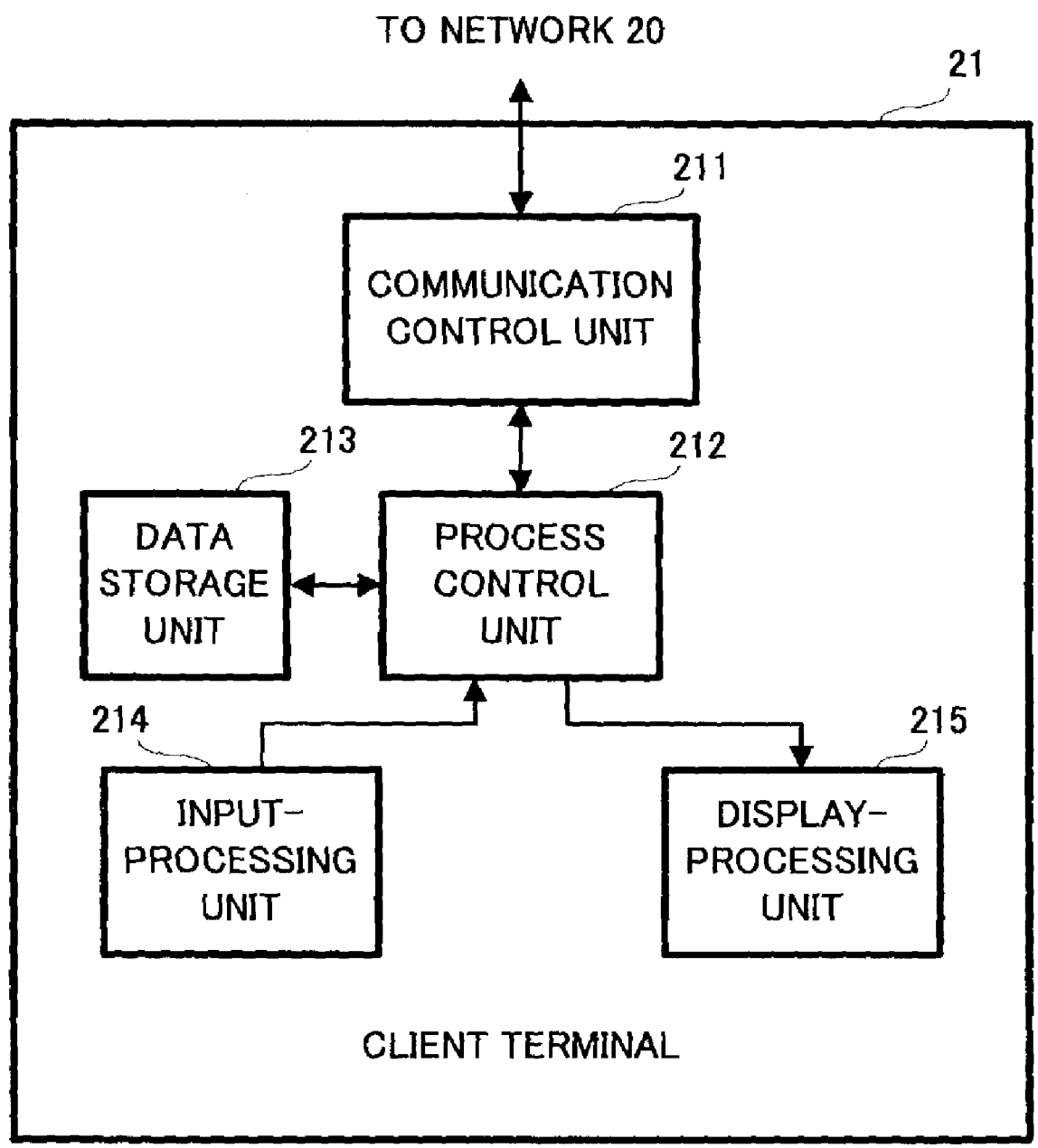

The client terminal 21 is a computer system composed of computers such as personal computers. The terminal is used for browsing images that show the shape of design components, by accessing the intra-section browsing management server 22 and the general-browsing management server 23. As shown in FIG. 6B, the client terminal 21 has, for example, a communication control unit 211, a process control unit 212, a data storage unit 213, an input-processing unit 214, and a display-processing unit 215. Basically, each of the units 211~215 mentioned above is similar to their counterparts in the CAD terminal 11, units 111~115.

Figure 7:
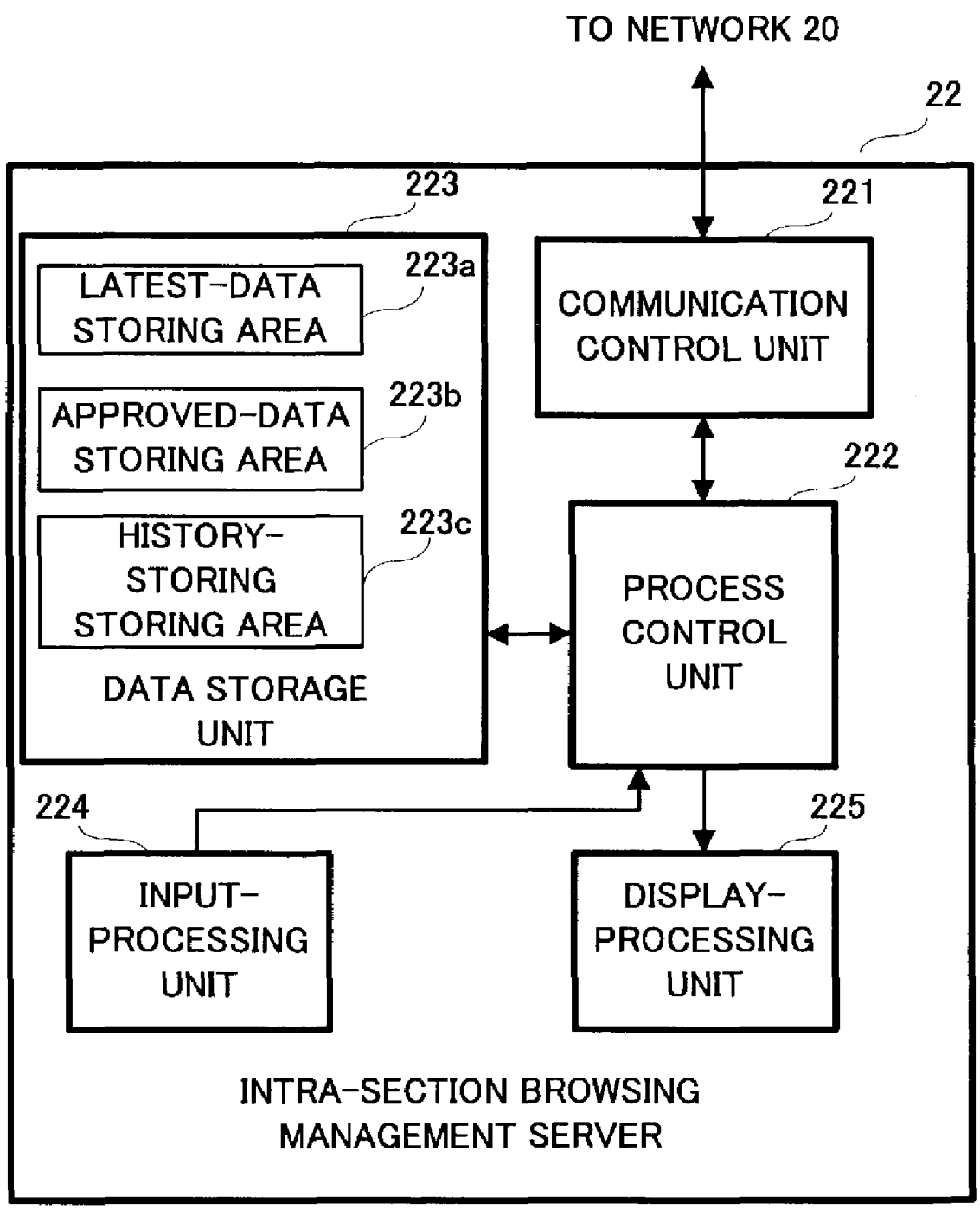
FIG. 7 shows the structure of the intra-section browsing management server.

The intra-section browsing management server 22 is a computer system for providing a browsing system, the users of which are limited to, e.g., members of a certain section. As shown in FIG. 7, the intra-section browsing management server 22 has, for example, a communication control unit 221, a process control unit 222A data storage unit 223, an input-processing unit 224, and a display-processing unit 225. Basically, each of the units 221~225 mentioned above is similar to their counterparts in the CAD terminal 11, units 111~115. The function of each unit is, however, specially designed for browsing 3-D shape data on the client terminal 21 of the information-browsing system 2.

For example, the data storage unit 223 includes a latest-data storing area 223A and an approved-data storing area 223B in order to store 3-D shape data, which is created by conversion in the conversion-processing device 13. Besides, the data storage unit 223 is equipped with a history-storing area 223C in order to store the history of access to the intra-section browsing management server 22 from the client terminal 21.

The latest-data storing area 223A stores 3-D shape data converted from 3-D CAD data, which is not approved as valid data. The approved-data storing area 223B stores 3-D shape data converted from 3-D CAD data, which has already been approved as valid data. Here, the latest-data storing area 223A and the approved-data storing area 223B store the converted 3-D shape data in folders that have the same name as the model name of a unit or a product that uses each component.

Figure 8:
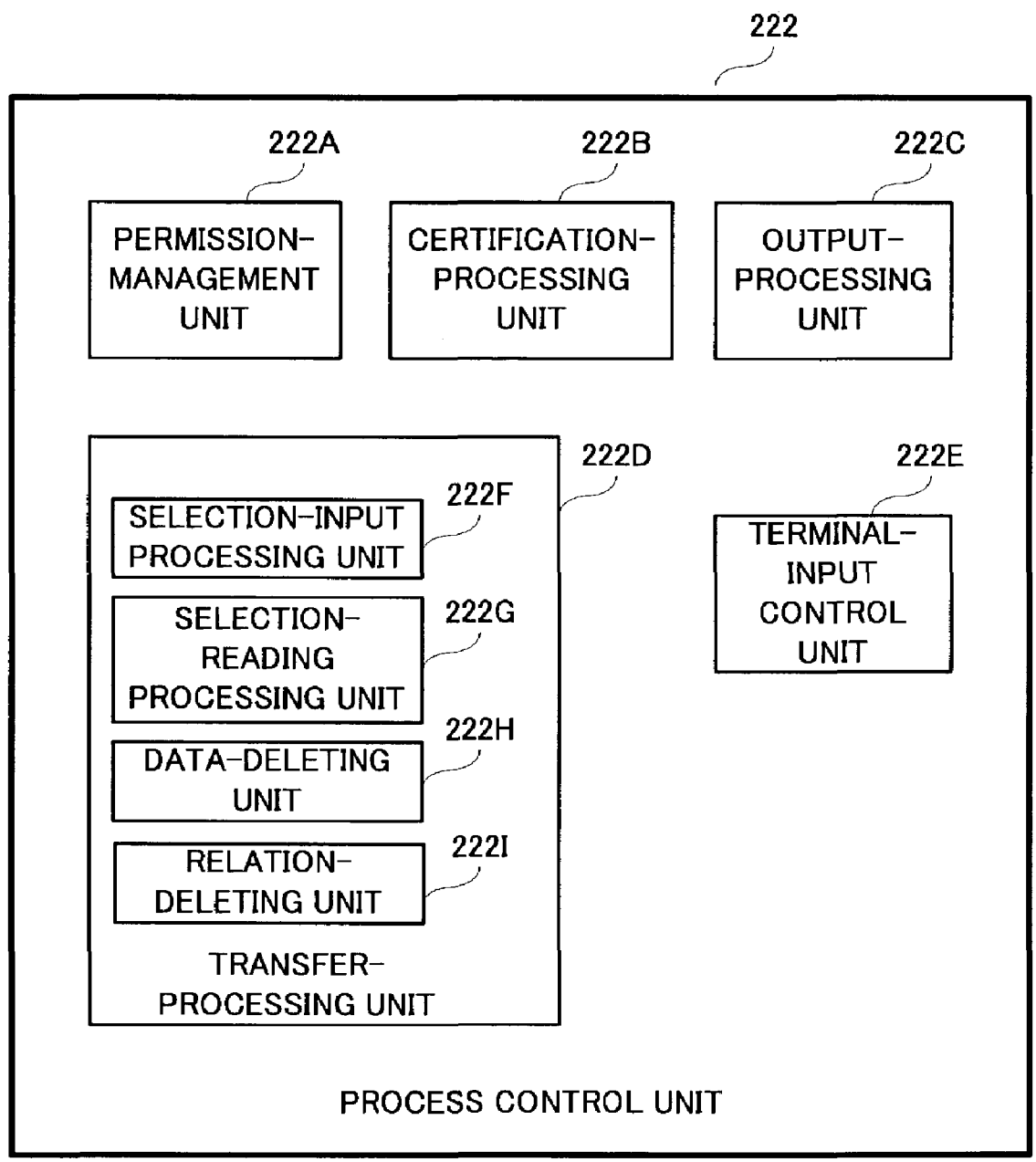
FIG. 8 shows the logical structure of the process control unit in the intra-section browsing management server.

As shown in FIG. 8, the process control unit 222 has the following units as logical structure: a permission-management unit 222A, a certification-processing unit 222B, an output-processing unit 222C, a transfer-processing unit 222D, and a terminal-input control unit 222E.

The permission-management unit 222A manages access permission for outputting 3-D shape data on the client terminal 21. Here, the data to be outputted is stored in the latest-data storing area 223A and the approved-data storing area 223B. The certification-processing unit 222B checks if a user trying to access the intra-section browsing management server 22 has access permission, by verifying the user ID and password inputted at the client terminal 21. The output-processing unit 222C enables users to look at the shape of components with 3-D shape data, by providing the data stored in the latest-data storing area 223A and the approved-data storing area 223B to the client terminal 21.

The transfer-processing unit 222D transfers the 3-D shape data to the general-browsing management server 23 after processing the original data. For example, the transfer-processing unit 222D is equipped with a selection-input processing unit 222f, a selection-reading processing unit 222g, a data-deleting unit 222h, and a relation-deleting unit 222i.

By communicating with the client terminal 21, the selection-input processing unit 222f enables users to input information for specifying 3-D shape data to be sent to the general-browsing management server 23 at the client terminal 21 or the intra-section browsing management server 22. For instance, the selection-input processing unit 222f displays a certain screen for input on the client terminal 21 or the display-processing unit 225, and enables users to input the parts number of the component indicated by the 3-D shape data, or the model name of a unit or a product that uses the component. The selection-reading processing unit 222g is used for reading 3-D shape data from the data storage unit 223 according to the information inputted at the client terminal 21 or the input-processing unit 224 the selection-input processing unit 222f.

The data-deleting unit 222h deletes a certain data of those read from the data storage unit 223 by the selection-reading processing unit 222g. For example, the data-deleting unit 222H deletes data that indicates a recognition number, which is used for recognizing 3-D shape data, and it deletes the data about the designer's name of a 3-D shape data. The relation-deleting unit 222I deletes the relation between the data read by the selection-reading processing unit 222G from the data storage unit 223 and attribute information stored in the attribute management server 14.

The terminal-input control unit 222E enables users to input various kinds of information at the client terminal 21, by communicating with the terminal using the communication control unit 221. For example, the terminal-input control unit 222E makes it possible to input parts numbers or model names of units or products to specify the 3-D shape data to be displayed on the client terminal 21.

Figure 9:
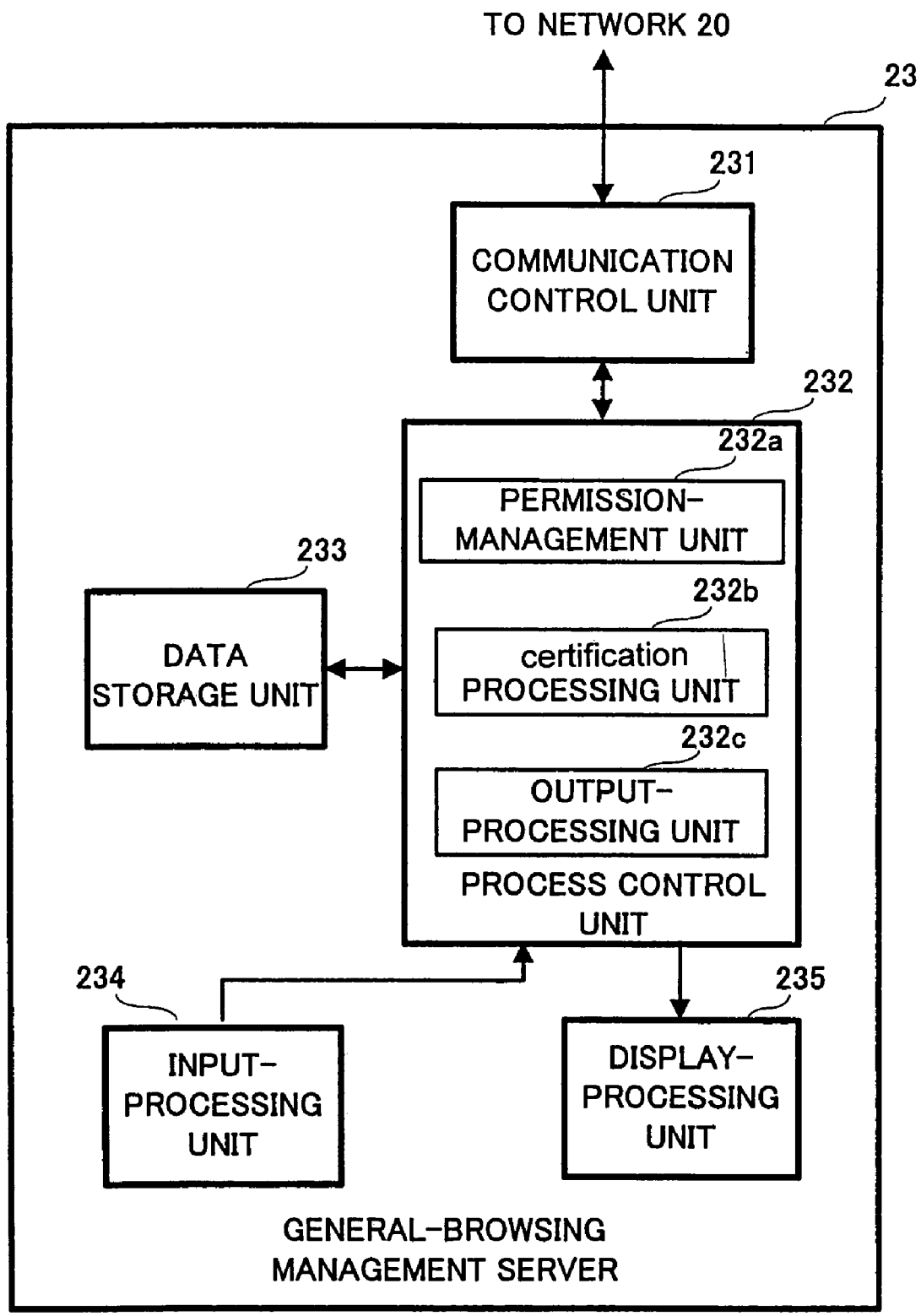
FIG. 9 shows the structure of the general-browsing management server.

The general-browsing management server 23 is a computer system that enables users who have permission to access a groupware to look at information such as component images, by providing an information management system built on the groupware. As shown in FIG. 9, the general-browsing management server 23 has, for example, a communication control unit 231, a process control unit 232, a data storage unit 233, an input-processing unit 234, and a display-processing unit 235. Basically, each of the units 231~235 mentioned above is similar to their counterparts in the CAD terminal 11, units 111~115. The function of each unit is, however, specially designed for the functions that can be realized by running the server software of the groupware. For instance, data for constructing a database that can be used on the groupware are stored in the data storage unit 233. Here, the data storage unit 233 stores compressed data of 3-D shape data for browsing the shape of components on the groupware.

The process control unit 232 has the following units as logical structure: a permission-management unit 232a, a certification-processing unit 232b, and an output-processing unit 232c.

The permission-management unit 232A manages access permission for outputting 3-D shape data on the groupware of the client terminal 21. The certification-processing unit 232B checks if the user trying to access the general-browsing management server 23 has access permission, by certifying the user ID and password inputted at the client terminal 21. The output-processing unit 232C enables users to look at the shape of components on the groupware, by providing data stored in the data storage unit 233 to the client terminal 21.

Figure 10:
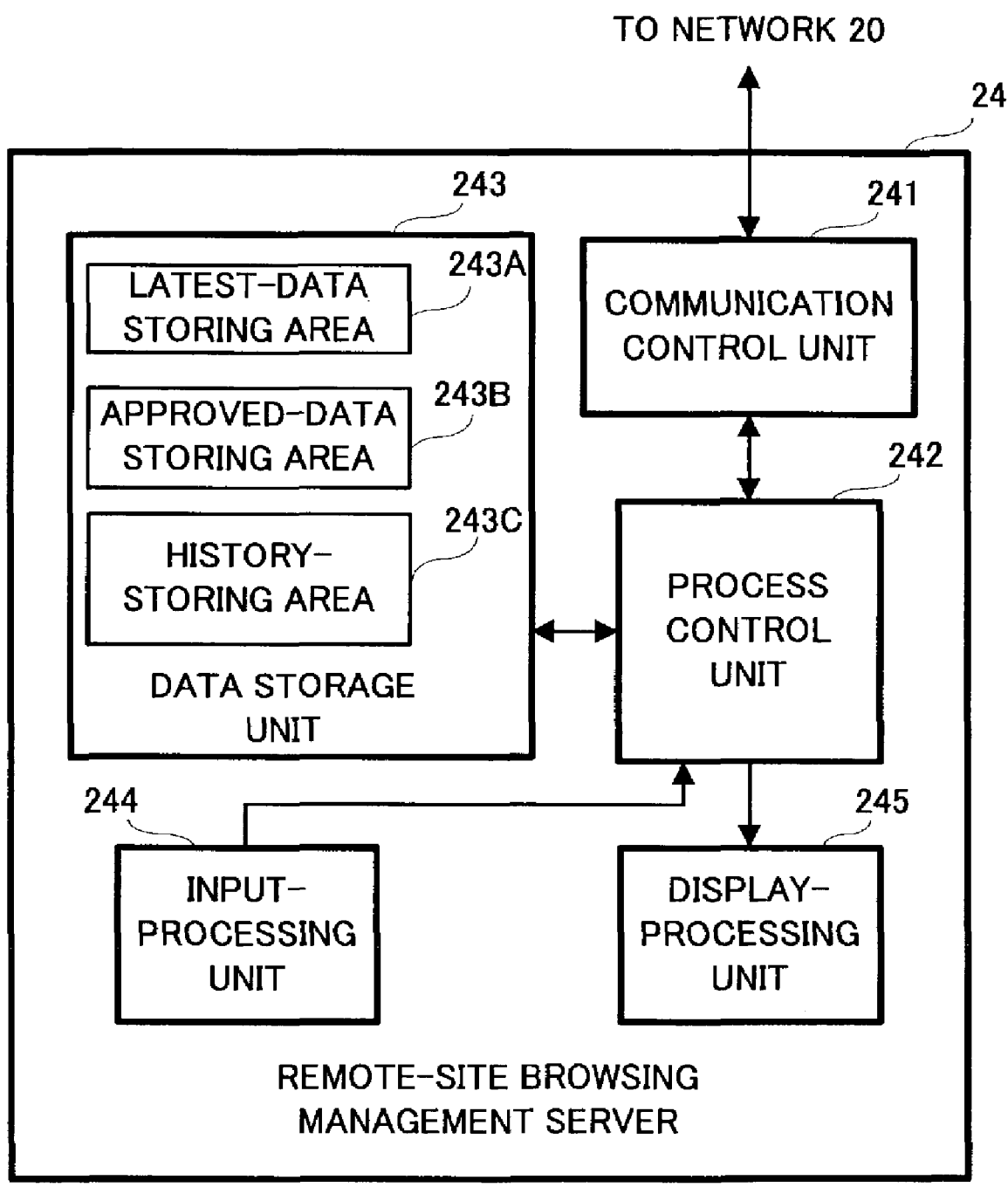
FIG. 10 shows the structure of the remote-site browsing management server.

The remote-site browsing management server 24 is a computer system to manage the 3-D shape data at remote sites where the intra-section browsing management server 22 is not installed. As shown in FIG. 10, remote-site browsing management server 24 has, for example, a communication control unit 241, a process control unit 242, a data storage unit 243, an input-processing unit 244, and a display-processing unit 245. Basically, each of the units 241~245 mentioned above is similar to their counterparts in the CAD terminal 11, units 111~115. The functions of each unit are, however, specially designed for management of 3-D shape data.

For example, data storage unit 243 includes a latest-data storing area 243A and an approved-data storing area 243B, and a history-storing area 243C. The latest-data storing area stores the 3-D shape data created in the conversion-processing device 13 by conversion from the 3-D CAD data that have not been approved as valid data. The approved-data storing area 243B stores the 3-D shape data created in the conversion-processing device 13 by conversion from the 3-D CAD data that have already been approved as valid data.

In the following, the behavior of the system with the structures described above will be explained. In this system, the 3-D CAD system 1 creates 3-D CAD data, and the information-browsing system 2 makes it possible to browse the shape of components using 3-D shape data.

When making 3-D CAD data in the 3-D CAD system 1, users input various kinds of information in the CAD terminal 11, and send it to the CAD management server 12. Here, the process control unit 122 in the CAD management server 12 makes it possible to input information at the CAD terminal 11, with the terminal-input control unit 122D.

Specifically, the terminal-input control unit 122D makes image information with forms to enter information, namely a dialog box, and sends it to the CAD terminal 11 using the communication control unit 121 via the network 10. Then, it displays the dialog box on the screen of the display-processing unit 115. In this dialog box, information such as the following is required to be inputted: the parts number of the component under design indicated by the 3-D CAD data; parts numbers of components used in the component of the 3-D CAD data with designs of them having been finished; the model name of a unit or a product that uses the component of the 3-D CAD data. Users can input various kinds of information at the CAD terminal 11 by operating the input-processing unit 114. The information inputted to the CAD terminal 11 is sent to the CAD management server 12 and the attribute management server 14 via the network 10.

When the CAD management server 12 receives information inputted at the CAD terminal 11, it stores the information in the data storage unit 123 after classifying it with the process control unit 122. More specifically, when the process control unit 122 receives 3-D CAD data newly created, it stores the data in the latest-data storing area 123A. Here, the process control unit 122 interprets the time measured with the time-and-date measuring unit 122A as the registration date of the 3-D CAD data. Then, it stores the registration date in the registration-date storing area 123C, relating the date to the 3-D CAD data stored in the latest-data storing area 123A. Besides, when the process control unit 122 receives a parts number inputted at the CAD terminal 11, it stores the number by relating it to one of the following area according to the parts number. If the parts number corresponds to the component indicated by the 3-D CAD data, the process control unit 122 relates the number to the first parts-number storing area 123F. On the other hand, if the parts number corresponds to the other components used in the component indicated by the 3-D CAD data, the process control unit 122 relates the number to the second parts-number storing area 123G.

When the process control unit 122 receives a model name inputted at the CAD terminal 11, it stores the name by relating it to one of the following area depending on if the name has already been stored in the model-name storing area 123H or not. If the model name has already been stored in the model-name storing area 123H, the process control unit 122 relates the name to the 3-D CAD data stored in the latest-data storing area 123A. On the other hand, if the name has not been stored in the model-name storing area 123H, the process control unit 122 stores the name in the model-name storing area 123H, and then relates the name to the 3-D CAD data stored in the latest-data storing area 123A. Here, the action of storing the model name in the model-name storing area 123H with relating it to the 3-D CAD data is carried out in the same way as that of storing the 3-D CAD data in the folder (directory) with the same name as the model name. In other words, the model name stored in the model-name storing area 123H has a function of a catalog that is used for classifying the 3-D CAD data according to its name when the data is stored.

The attribute information of components inputted at the CAD terminal 11 is sent to the attribute management server 14, and then related to the 3-D CAD data that is stored in the CAD management server 12.

Figure 11:
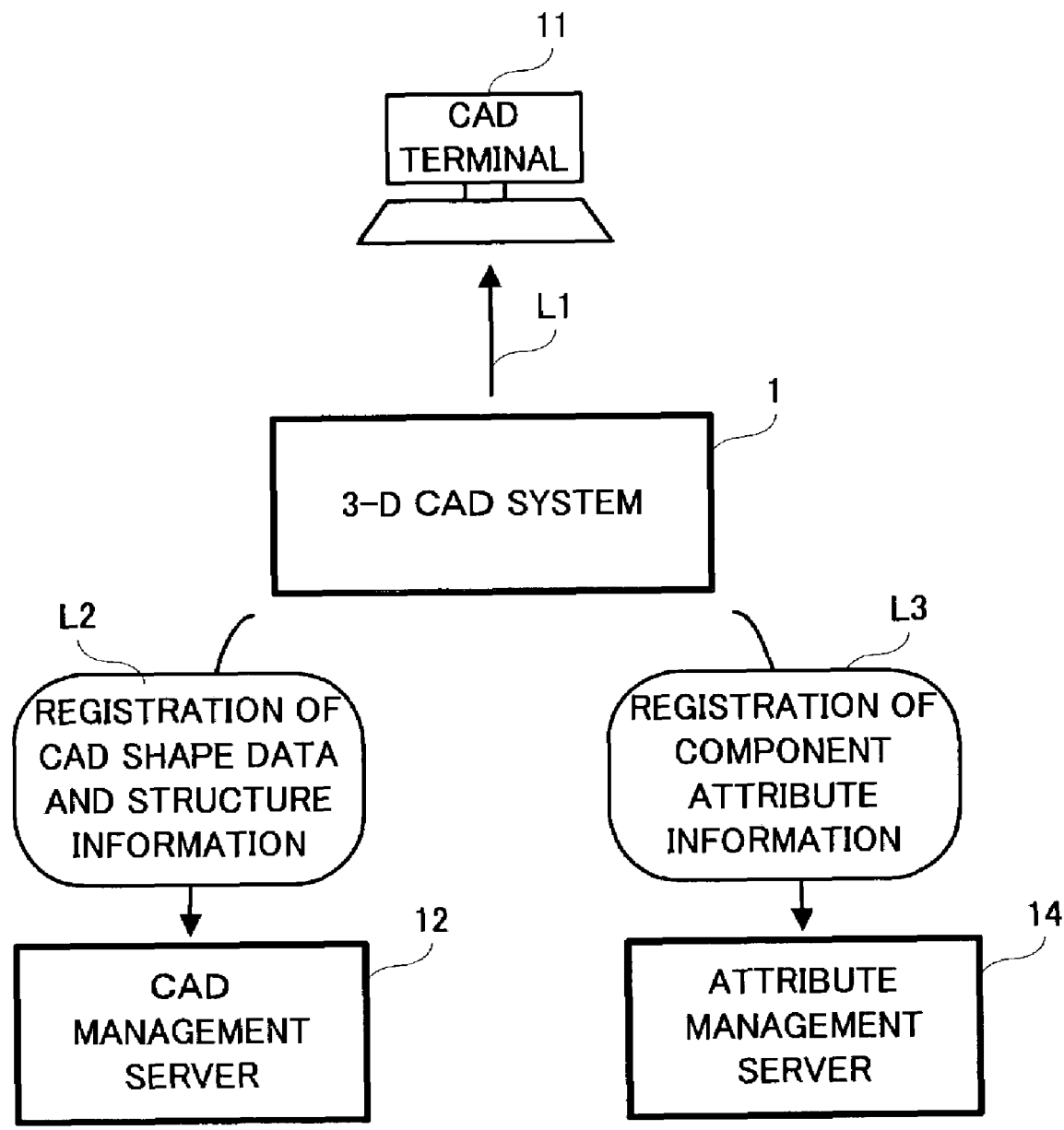
FIG. 11 illustrates the registration action of data made by the 3-D CAD system.

In the way explained above, the data created by the 3-D CAD system 1 is stored in the CAD management server 12 and the attribute management server 14, and then it is managed. Specifically, as shown in FIG. 11, the data created by the 3-D CAD system 1 can be sent to the CAD terminal 11 and checked (L1). Besides, the data that indicates the shape of the design components (CAD shape data) and structure information (parts number, the file name of CAD data, parts name, model name, etc) are registered in the CAD management server 12 (L2). Attribute information of components such as material, color, and relative density, is registered in the attribute management server 14 (L3).

In this way, the 3-D CAD data that indicate the components under design, or that have not been approved as valid data, are stored in the latest-data storing area 123A. The 3-D CAD data stored in the latest-data storing area 123A are object of conversion with time stamp, which is carried out periodically when current time is past the time stored in the time-storing area 123E. In this conversion process, the conversion-processing device 13 converts the newly registered 3-D CAD data into 3-D shape data.

Figure 12:
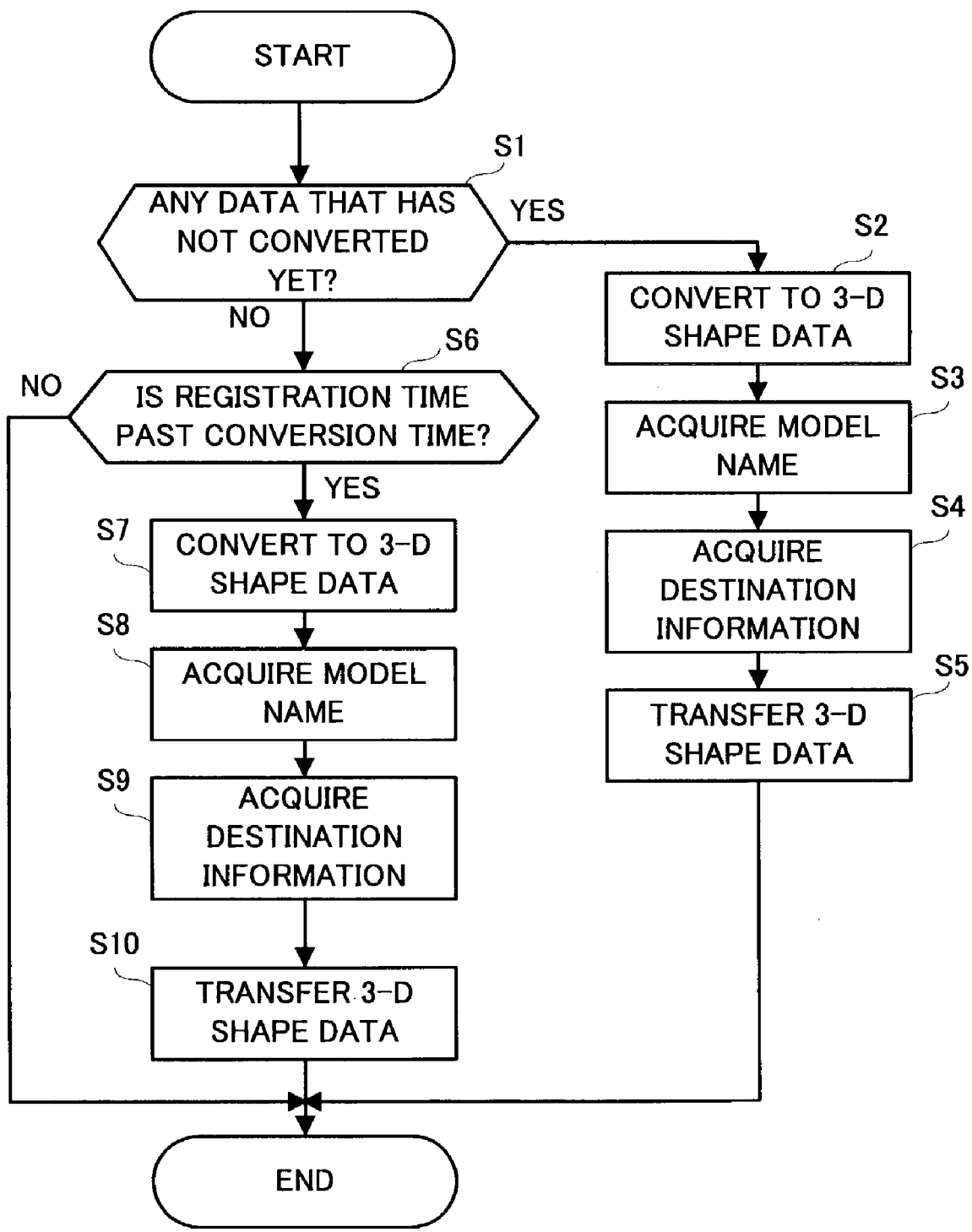
FIG. 12 is a flow chart showing the conversion process with time stamp.

In order to convert 3-D CAD data with time stamp, processes shown in the flow chart of FIG. 12 are carried out. At first, the process control unit 122 in the CAD management server 12 checks if current time is past the time stored in the time-storing area 123E, according to the result of the comparison carried out by the time-comparing unit 122C. Then, if current time is past the time stored in the time-storing area 123E, the process control unit 122 runs a certain program stored in the data storage unit 123 and starts the processes shown in the flow chart of FIG. 12.

When the processes shown in the flow chart of FIG. 12 start, the process control unit 122 finds 3-D CAD data that has no corresponding 3-D shape data. Specifically, by searching the conversion-date storing area 123D for the 3-D CAD data whose conversion date is invalid, the process control unit 122 determine if there are 3-D CAD data that have not been converted to 3-D shape data by the conversion-processing device 13 (step S1).

If the process control unit 122 determines that there are 3-D CAD data that have not been converted to 3-D shape data, it sends the 3-D CAD data to the conversion-processing device 13 and requests conversion to 3-D shape data. Specifically, the process control unit 122 searches the first parts-number storing area 123F for parts numbers of design components that have not converted to 3-D shape data. The process control unit 122 then reads the 3-D CAD data related to the parts numbers from the latest-data storing area 123A, and it sends them to the conversion-processing device 13.

At this time, along with the 3-D CAD data to be converted, the process control unit 122 sends 3-D CAD data of other components used by the component indicated by the 3-D CAD data, to the conversion-processing device 13. In more detail, the process control unit 122 searches the second parts-number storing area 123G with the search-processing unit 122E, and specifies the parts numbers of components that are related to the 3-D shape data to be converted. Subsequently, the process control unit 122 searches the first parts-number storing area 123F for the parts numbers specified in the second parts-number storing area 123G. If the parts numbers are found, the process control unit 122 can extract the 3-D CAD data of other components that are related to the parts number of the 3-D data under design. The process control unit 122 sends the 3-D CAD data extracted in the way described above to the conversion-processing device 13. Then it requests the conversion of the data to 3-D shape data, together with the 3-D CAD data to be converted by the time stamp process.

In this way, if there are any 3-D CAD data that have not been converted to the 3-D shape data, the conversion-processing device 13 receives the 3-D CAD data from the CAD management server 12. The process control unit 132 in the conversion-processing device 13 creates 3-D shape data that corresponds to the received 3-D CAD data, by running a certain program (step S2). Specifically, the conversion-processing unit 132a converts two kinds of 3-D CAD data specified in the CAD management server 12: one is those read from the latest-data storing area 123A by specifying the parts number using the first parts-number storing area 123F; and the other is those found by the search-processing unit 122E. By this procedure, 3-D shape data corresponding to each 3-D CAD data are created. After completing the conversion process by the conversion-processing unit 132a, the process control unit 122 in the CAD management server 12 interprets current time and date measured by the time-and-date measuring unit 122A as conversion date. Then it stores the time and date in the conversion-date storing area 123D, relating them to the converted 3-D CAD data.

From the CAD management server 12, the conversion-processing device 13 also acquires the name of a unit or a product that uses the component indicated by the converted 3-D CAD data (step S3). When the process control unit 122 in the CAD management server 12 sends the 3-D CAD data to be converted, to the conversion-processing device 13, it reads the name of the unit or product from the model-name storing area 123H and sends the name along with the 3-D CAD data. At this time, the process control unit 122 reads the parts number of the component indicated by the 3-D CAD data to be sent to the conversion-processing device 13, from the first parts-number storing area 123F, and then it sends the number to the conversion-processing device 13. In other way, the process control unit 122 may read the parts number of the component indicated by the 3-D CAD data that is the object of the conversion process with time stamp, from the first parts-number storing area 123F. Then it may read the parts numbers that are related to the 3-D CAD data concerned from the second parts-number storing area 123G and send the latter numbers to the conversion-processing device 13.

The conversion-processing device 13 acquires information about the destination of the 3-D shape data created by conversion, from the CAD management server 12 (step S4). When the process control unit 122 in the CAD management server 12 sends 3-D CAD data, which is to be converted, to the conversion-processing device 13, it also sends the information about the storing area where the 3-D CAD data are stored (the latest-data storing area 123A and the approved-data storing area 123B). In addition, if the destination of 3-D shape data is specified at the CAD terminal 11 when 3-D CAD data are created, the process control unit 122 stores the destination information in the attribute database 127 with relating it to the 3-D CAD data. When the process control unit 122 requests conversion, it sends the destination information to the conversion-processing device 13 along with the 3-D CAD data.

When the conversion-processing unit 132A completes the conversion process of 3-D CAD data as described above, the distribution-control unit 132B sends the converted 3-D shape data to the destination specified by the CAD management server 12 (step S5). For example, if the distribution-control unit 132B determines that the converted 3-D CAD data is stored in the latest-data storing area 123A according to the information sent from the CAD management server 12, it sends the created 3-D shape data to the intra-section browsing management server 22 via the network 20. The distribution-control unit 132B then makes the data stored in the latest-data storing area 223A of the intra-section browsing management server 22. At this time, the distribution-control unit 132B sends commands to the intra-section browsing management server 22 with communication-processing unit 131, and makes it store the 3-D shape data in the folder of the latest-data storing area 223A that has the same name as the model name acquired in the step S3. Besides, the distribution-control unit 132B sends the parts number of the components indicated by each 3-D shape data, to the intra-section browsing management server 22.

When the process control unit 222 in the intra-section browsing management server 22 receives 3-D shape data from the conversion-processing device 13, it stores the data in the data storage unit 223 with relating them to the parts number of the components indicated by the 3-D shape data. By this procedure, the 3-D shape data converted from the 3-D CAD data with time stamp is stored, being related to the parts number of the component indicated by the 3-D shape data. In addition, the 3-D shape data that is created based on the 3-D CAD data selected by the search-processing unit 122E in the CAD management server 12, is stored with related to the parts numbers that are specified by the search-processing unit 122E by searching the second parts number storing region 123G. In this case, each 3-D shape data is also related to the name of a unit or a product that uses the component indicated by each 3-D shape data, by being stored in the folder that has the same name as the model name.

The distribution-control unit 132B sends 3-D shape data to the remote-site browsing management server 24, in the same way as it sends them to the intra-section browsing management server 22. Then it marks the information stored in the storing area specified by the CAD management server 12 (such as the latest-data storing area 243A).

When the process control unit 122 decides in the step S1 that all the 3-D CAD data have been converted to the 3-D shape data, it further determines if there is any 3-D shape data older than the corresponding 3-D CAD data (step S6). This decision is done according to the result of the comparison carried out by the date-comparing unit 122B. If there is no data whose registration date is past their conversion date, the process control unit 122 terminates the processes shown in the flow chart of FIG. 12.

On the other hand, if there are any data whose registration date are past their conversion date, the process control unit 122 sends the corresponding 3-D CAD data to the conversion processing device 13 and requests the conversion to the 3-D shape data. The conversion processing device 13, which received the 3-D CAD data sent from the CAD management server 12, converts the received data in the same way as steps S2~S5, and it sends the converted data to servers such as the intra-section browsing management server 22 and the remote-site browsing management server 24 (steps S7~S10).

In addition, when a 3-D CAD data stored in the latest-data storing area 123A is approved as valid data, the data is stored in the approved-data storing area 223B and makes it possible to be recognized as approved data. Specifically, the process control unit 122 of the CAD management server 12 responds to a request, for example, from the CAD terminal 11, and runs a certain program. By this procedure, the terminal-input control unit 122D makes, for example, image information of dialog box by which users can specify 3-D CAD data, and input requests for approval of the data. Then the terminal-input control unit 122D sends the information to the CAD terminal 11 via the communication control unit 121. In the CAD terminal that received the image information from the CAD management server 12, the display-processing unit 115 shows the dialog box for inputting a request for approval, under the control of process control unit 112, and makes it possible to input requests by operating the input-processing unit 114. The request for approval inputted in the CAD terminal 11 is sent to the CAD management server 12 via the network 10.

Figure 13:
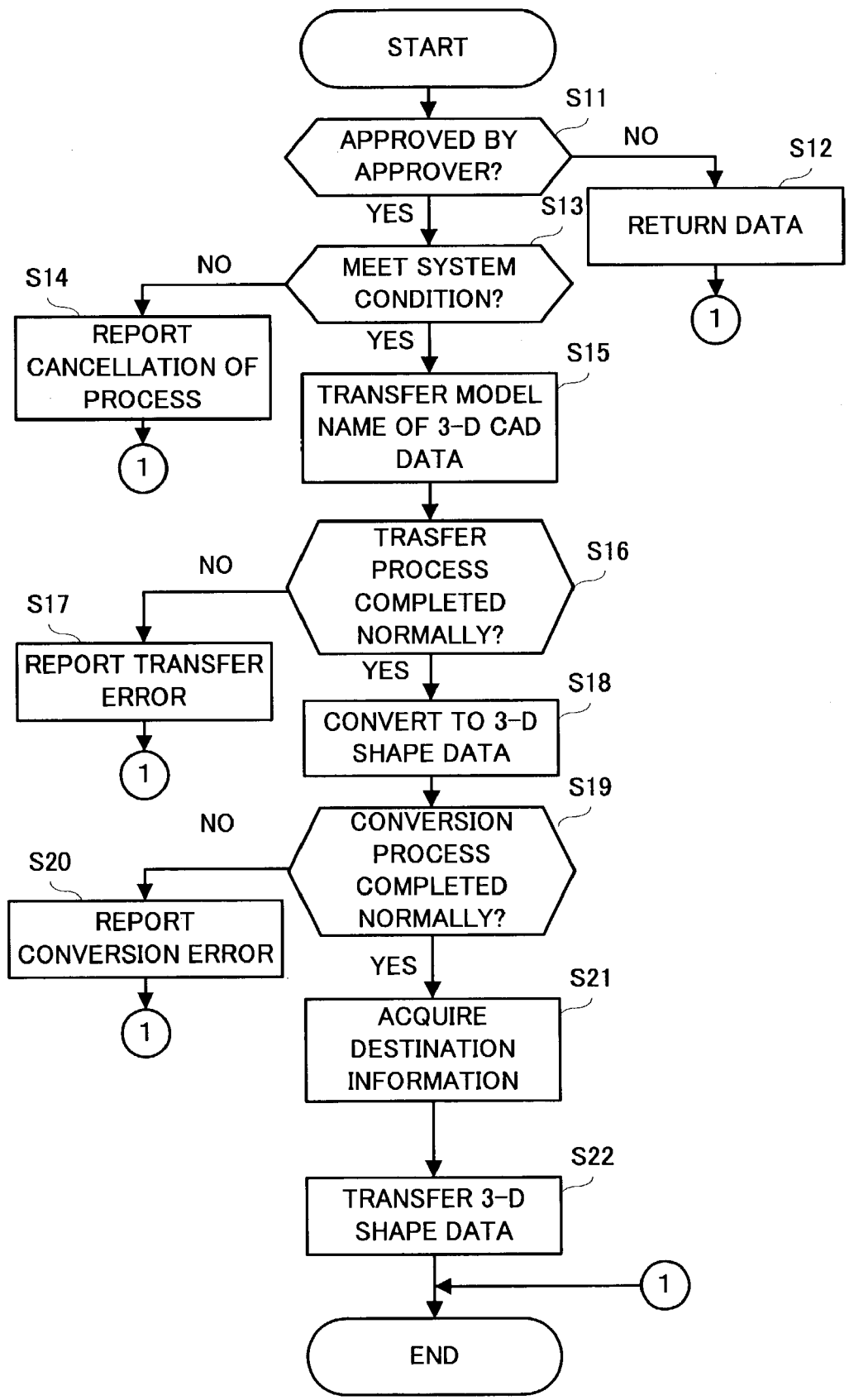
FIG. 13 is a flow chart showing the process carried out when a request for data approval is inputted.

In this way, when a request for approval of the 3-D CAD data stored in the latest-data storing area 223A as valid data are inputted, the processes shown in the flow chart of FIG. 13 is carried out to convert the 3-D CAD data to 3-D shape data. The process control unit 122 of the CAD management server 12 responds to, for example, a request for approval of 3-D CAD data from the CAD terminal 11, and it runs a certain program stored in the data storage unit 123 and starts the processes shown in the flow chart of FIG. 13.

When the processes shown in the flow chart of FIG. 13 starts, the process control unit 122 sends the approval-requested 3-D CAD data to approver's terminal via the communication control unit 121, and the approver judges the approval of data. The process control unit 122 also receives judgment of approval or disapproval, and it decides if the request of approval was accepted or rejected according to the received judgment (step S11). If the process control unit 122 decides that the request of approval was rejected, it returns the requested 3-D CAD data to the user who requested the approval, by sending it to the CAD terminal 11 via communication control unit 121 (step S12).

On the other hand, when the process control unit 122 decides that the request of approval was accepted, it further determines if the 3-D CAD data to be converted meets system conditions (step S13). If the process control unit 122 decides that the 3-D CAD data does not meet the system conditions, e.g., due to lack of parameters necessary to carry out the conversion process, it informs both applicant and approver of the conversion that the conversion process was cancelled, e.g., by sending an error massage to the CAD terminal 11 (step S14).

On the other hand, if the process control unit 122 decides that the system conditions are met, it sends the 3-D CAD data to be converted, to the conversion-processing device 13 using the communication control unit 121. In this case, the process control unit 122 reads the model name that is stored in the model-name storing area 123H and is related to the 3-D CAD data, and it sends the name to the conversion-processing device 13 along with the 3-D CAD data (step S15). In addition, the process control unit 122 sends the 3-D CAD data of the other components, which are used by the component indicated by the 3-D CAD data to be converted, to the conversion-processing device 13 along with the 3-D CAD data to be converted. In this case, the process control unit 122 sends the parts number of each 3-D CAD data to the conversion-processing device 13, in the same way as the conversion with time stamp.

The process control unit 122 decides if the transfer processes of data such as 3-D CAD data are completed normally, e.g., by watching the response signal that is sent from the conversion-processing device 13 and received by the communication control unit 121 (step S16). If the process control unit 122 decides that the transfer was a failure, it sends e-mail with error message to the administrator, which informs him/her that transfer error occurred (step S17).

On the other hand, if the transfer of data such as 3-D CAD data was completed normally, the process control unit 132 of the conversion-processing device 13 runs a certain program to convert the 3-D CAD data sent from the CAD management server 12 to the corresponding 3-D shape data, using the conversion-processing unit 132a (step S18). At this time, the process control unit 132 decides if the conversion process carried out by the conversion processing unit 132a was completed normally (step S19). If the process control unit 132 determines that the conversion was a failure, it sends e-mail with error message to the administrator, which informs him/her conversion error occurred (step S20).

On the other hand, if the conversion process was completed normally, the conversion-processing device 13 acquires information about the destination of the created 3-D shape data, from the CAD management server 12 (step S21). Here, when the process control unit 122 of the CAD management server 12 sends the 3-D CAD data to be converted to the conversion-processing device 13, information about that the 3-D CAD data is stored in the approved-data storing area 123B is also sent. Besides, if the destination of the 3-D CAD data is specified at the time of 3-D data creation or its approval, the process control unit 122 sends the destination information to the conversion-processing device 13 with the 3-D CAD data.

When the conversion process of the 3-D CAD data by the conversion-processing unit 132a was completed in the way described above, the distribution-control unit 132b sends the 3-D shape data to the destination specified by the CAD management server 12 (step S22). Here, the created 3-D shape data converted from the approved 3-D CAD data is stored, e.g., in the approved-data storing area 223B of the intra-section browsing management server 22. Because the corresponding 3-D CAD data is stored in the approved-data storing area 123B of the CAD management serer 12.

The process control unit 122 of the intra-section browsing management server 22 stores the 3-D shape data sent from the conversion-processing device 13 in the data storage unit 223, in the same way as the conversion with time stamp. The distribution-control unit 132b sends the 3-D shape data to the remote-site browsing management server 24 in the same way as sending them to the intra-section browsing management server 22. Then, the remote-site browsing management server 24 is made to store the 3-D shape data in the approved-data storing area 243B, according to the information sent form the CAD management server 12.

Figure 14:
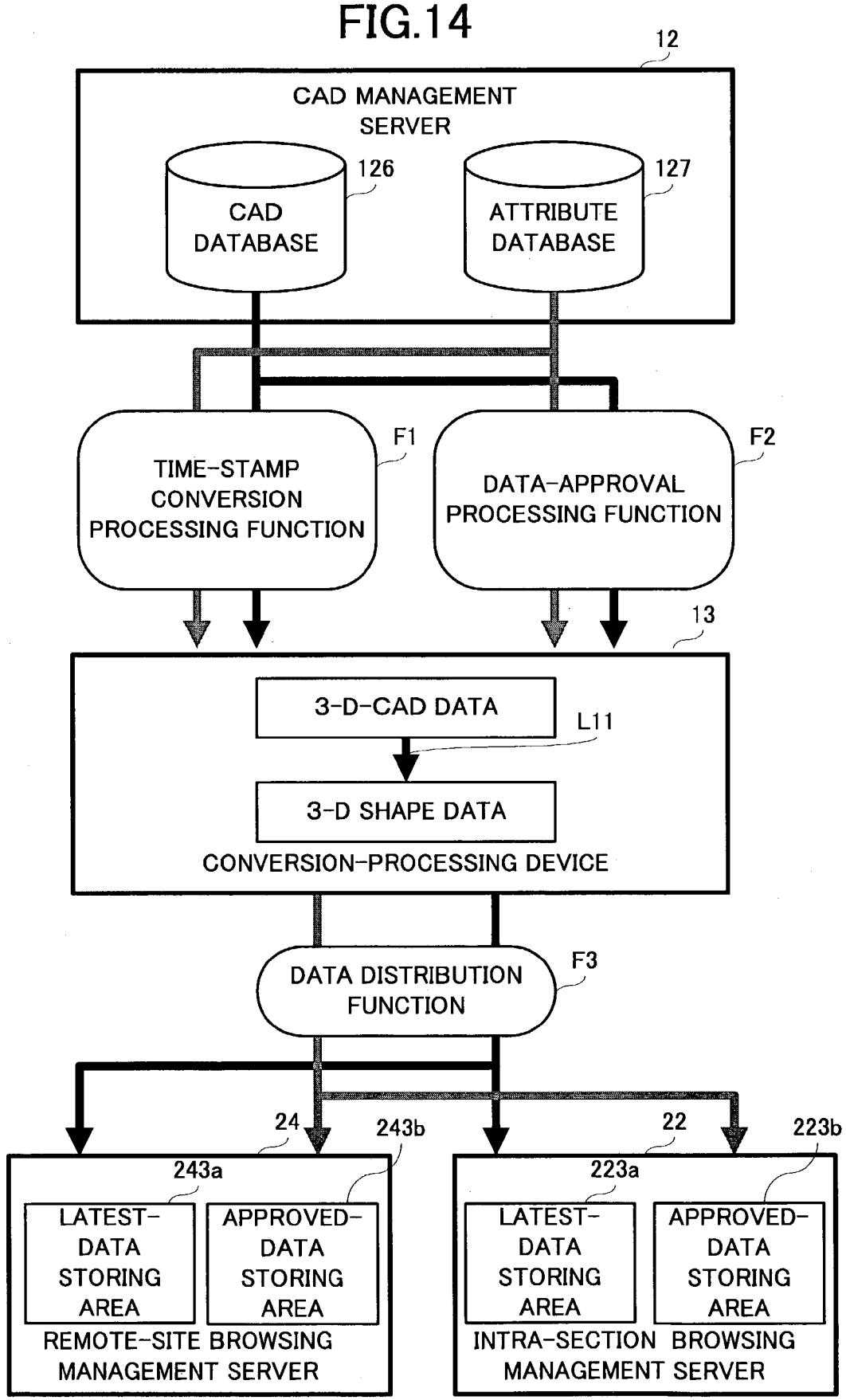
FIG. 14 illustrates the action of creating the 3-D shape data by conversion from the 3-D CAD data, and that of distributing them.

As described above, the 3-D shape data created by conversion from the 3-D CAD data are distributed to the intra-section browsing management server 22 and the remote-site browsing management server 24, and stored in those servers. In other words, as shown in FIG. 14, the CAD management server 12 and the conversion-processing device 13 realize the time-stamp conversion processing function F1, by co-operating to carry out the processes described in the flow chart of FIG. 12. Besides, the CAD management server 12 and the conversion-processing device 13 also realize the data-approval processing function F2, by co-operating to carry out the processes described in the flow chart of FIG. 13. The conversion-processing device 13 converts 3-D CAD data into 3-D shape data, with the 3-D CAD data being acquired by the time-stamp conversion processing function F1 and the data-approval processing function F2 (L11). The 3-D shape data created in the way described above are sent to the intra-section browsing management server 22 and the remote-site browsing management server 24 by the data distribution function F3, and stored in those servers.

The 3-D shape data, which are stored in the intra-section browsing management server 22 are displayed on the client terminal 21, by responding to the operation of the users who have the access permission to the browsing system, e.g., of the intra-section browsing management server 22. The users of those servers are given access permissions by setting certification symbols for each user in advance, e.g., with the permission-management unit 222A of the process control unit 222. Users can look at the shape of components shown by 3-D shape data, by operating the input-processing unit 214 of the client terminal 21 to input the certification symbols, each of which has a user ID and a password.

Figure 15:
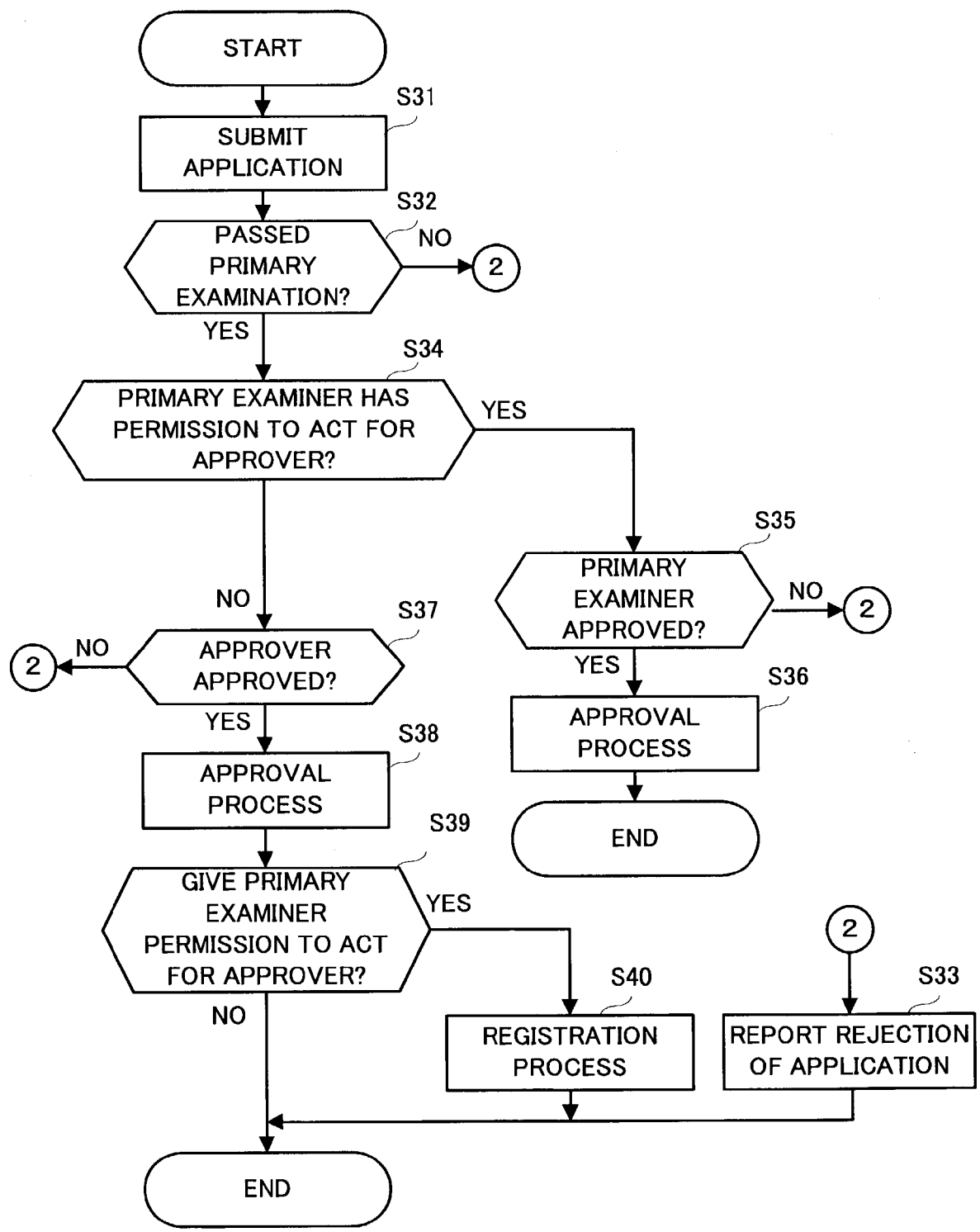
FIG. 15 is a flow chart showing the process carried out when acquiring access permission to access the browsing system.

When users request access permission to the browsing system provided by servers such as the intra-section browsing management server 22, processes shown in the flow chart of the FIG. 15, for example, are carried out.

Specifically, when users request access permission to the browsing system of servers such as the intra-section browsing management server 22, they submit application for the access permission to those servers to the administrator of the corresponding browsing system (step S31). The submission of the application is made possible by displaying a dialog box with a certain form on the display-processing unit 215 of the client terminal 21, by which users can, e.g., make e-mail to administrator with the input-processing unit 214.

The process control unit 222 of the intra-section browsing management server 22 responds to the application for the access permission from the client terminal 21, and executes a program for making information necessary for the primary examiner to examine the application. For example, the permission-management unit 222A makes the examination of the submitted application possible, by making an e-mail that shows the contents of the application submitted in the step S31, and by sending it to an administrator who has the permission to carry out the primary examination. The permission-management unit 222A receives reply from the primary examiner, and it decides if the submission was accepted (step S32).

When the permission-management unit 222A determines that the application did not pass the primary examination, it makes an e-mail to inform the applicant that the application was rejected. Then, by sending the e-mail to the applicant of the permission (step S33), the permission-management unit 222A terminates the processes shown in the flow chart of FIG. 15.

On the other hand, when the permission-management unit 222A decided that the application passed the primary examination, it further determines if the primary examiner has the permission to act for approver (step S34). Specifically, the permission-management unit 222A decides if the primary examiner has the permission to act for approver, e.g., by reading the information about the primary examiner from the data storage unit 223, where the information was stored in advance.

When the permission-management unit 222A decides that the primary examiner has the permission to act for approver, it carries out processes necessary for the primary examiner to approve the access permission, and it determines if the permission was approved or not (step S35). For example, the permission-management unit 222A displays a screen for approval on the display-processing unit 225. Then, it enables the primary examiner to approve permission, by responding to the input from the input-processing unit 224. The screen for approval has a dialog box for inputting user ID and password for certification of the primary examiner. After inputting the user ID and password for approval process by operating the input-processing unit 224, the primary examiner can approve the permission.

When the permission-management unit 222A decides that the primary examiner did not approve the permission, it makes processes proceed to step S33, to announce the rejection of the submission, and it terminate the processes shown in the flow chart of FIG. 15. On the other hand, when the permission-management unit 222A decides that the primary examiner approved the permission, it sets user ID and password to assign to the user who requested the access permission. Then, the permission-management unit 222A carries out the processes for approval, for example, by sending e-mail to the applicant (step S36).

When the permission-management unit 222A decides, in step S34, that the primary examiner has no permission to act for approver, it carries out processes necessary for the approver (i.e. a administrator who has the permission to approve the access permission for users) to approve the permission, and then it checks if the permission is approved (step S37). Specifically, the permission-management unit 222A makes, for example, the display-processing unit 225 show a dialog box for approval, and enables the approver to give access permission, by responding to the input from the input processing unit 224. The screen for approval has a dialog box to enter user ID and password for certification of the approver. The approver can give access permission after operating the input-processing unit 224 to input the user ID and password for approving permission.

When the permission-management unit 222A decides that the approver did not approve the permission, it makes the process proceed to step S33 to announce the rejection of application, and then it terminates the processes shown in the flow chart of FIG. 15. On the other hand, when the permission-management unit 222A decides that the approver approved the permission granting, it sets user ID and password to assign to the user who requested the access permission. Then, it carries out processes for approval, for example, by sending e-mail to the applicant (step S38).

When the approving process according to step S38 is carried out, the permission-management unit 222A enables the approver to give the primary examiner permission to act for approver, by displaying a query screen on the display-processing device 225. Shown in this query screen are messages such as "Do you give the primary examiner permission to act for approver?" or buttons for making it possible for approver to give permissions to act for approver, by responding to the operation of the approver to the input-processing unit 224. The permission-management unit 222A decides if it gives the primary examiner permission to act for approver, according to the input from the input-processing unit 224 (step S39). In this case, if the permission-management unit 222A decides that it does not give permission to act for approver, it terminates the processes shown in the flow chart of FIG. 15.

On the other hand, if the permission-management unit 222A decides that it gives the primary examiner the permission to act for approver, it sets user ID and password for approval process to assign to the primary examiner. Then, it carries out the registration processes for giving the permission to act for approver, for example, by sending e-mail to the primary examiner (step S40).

After a user applied for access permission and the approver approved the access permission in the way described above, it is possible to change the user ID and password for approval, and to give the primary examiner permission to act for approver. By this procedure, it is possible for the primary examiner to approve access permission when users apply it in the future, making the access-permission approving process and its management more efficient.

The users who obtained the access permission for the browsing system that is provided by, for example, the intra-section browsing management server 22 can look at the shape of components shown by 3-D shape data, for example, by operating the input-processing unit 214 of the client terminal 21 to command to start up the browsing system. When the command to start up the browsing system is inputted to the client terminal 21, the process control unit 222 of the intra-section browsing management server 22 runs a program to start the processes shown in the flow chart of the FIG. 16.

Figure 16:
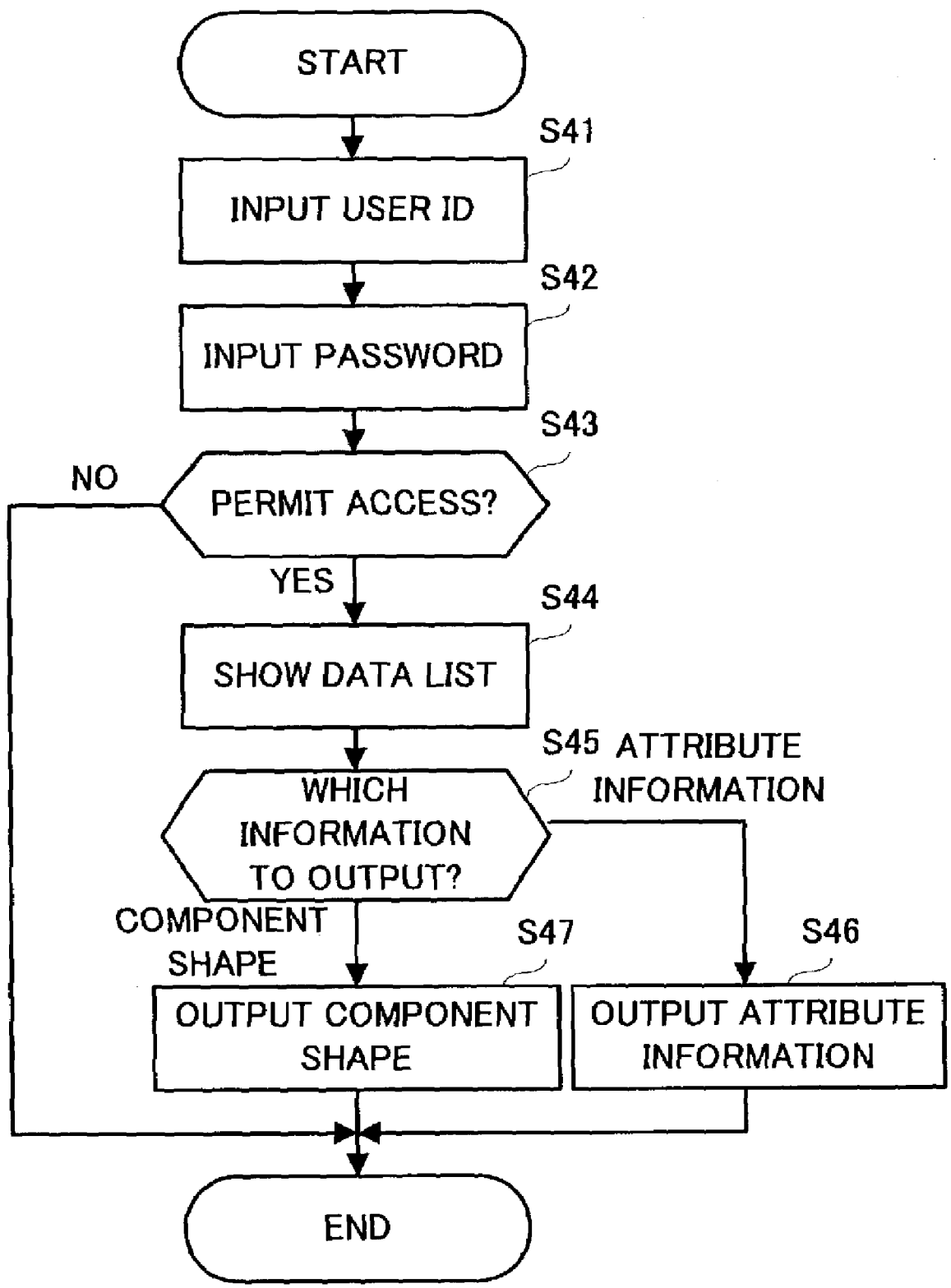
FIG. 16 is a flow chart showing the process of enabling the browsing of information such as component shape, using 3-D shape data.
Figure 17:
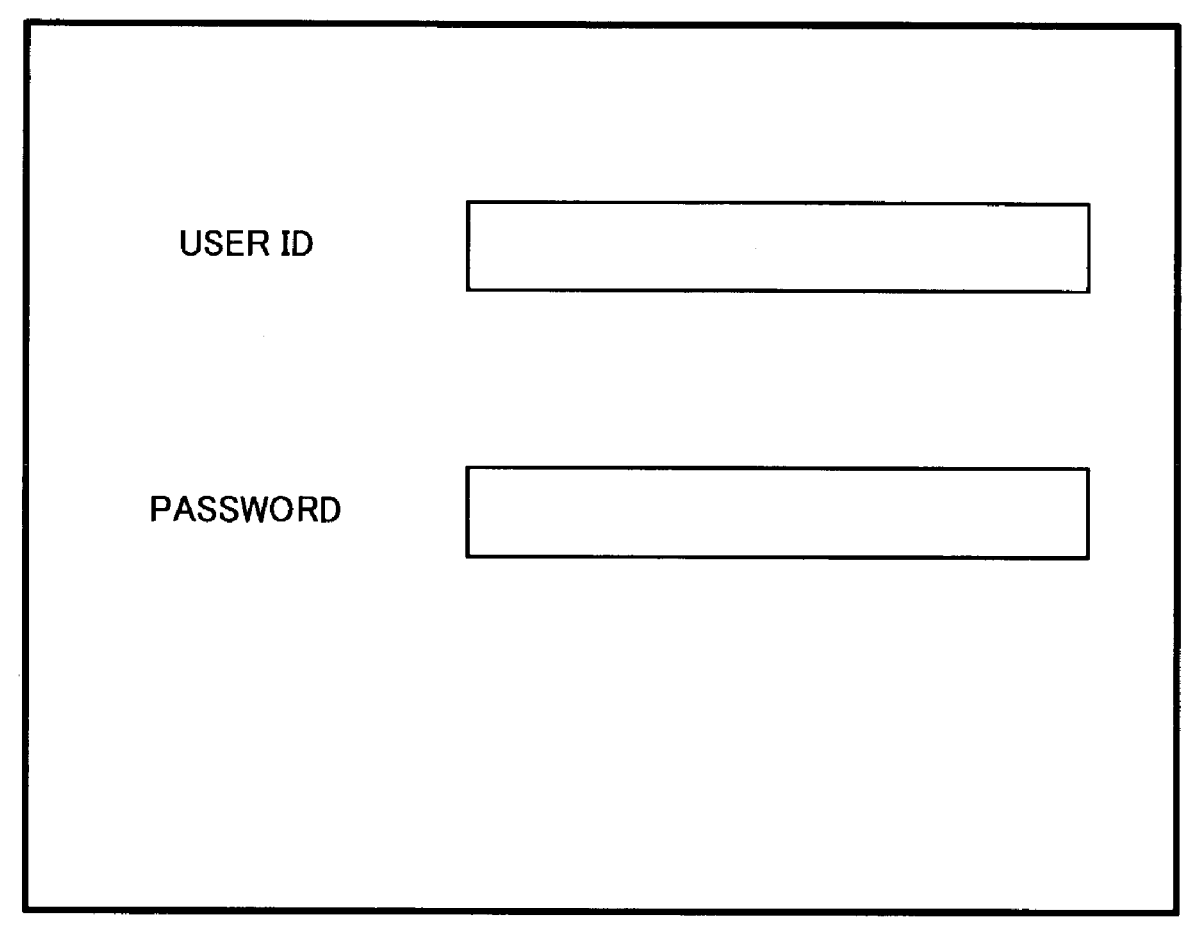

When the processes shown in the flow chart of the FIG. 16 start, the terminal-input control unit 222E of the process control unit 222 enables users to input information necessary for accessing the browsing system that is provided by the intra-section browsing management server 22. Specifically, as shown in FIG. 17, the terminal-input control unit 222E makes image information of a dialog box to enter user ID and password. Then, by sending the information to the client terminal 21 via the network 20 using the communication control unit 221, it makes the dialog box displayed on the screen of the displaying-processing unit 215. Users can input their user ID and password on the client terminal 21, by operating the input-processing unit 214. When a user ID is inputted (step S41) and then the corresponding password is inputted (step S42) on the client terminal 21, the inputted information is sent to the intra-section browsing management server 22 via the network 20.

When the intra-section browsing management server 22 receives the user ID and password from the client terminal 21, the process control unit 222 conducts the certification process with the certification-processing unit 222B, and it determines whether to permit the access or not (step S43). If it decides not to permit the access, it terminates the processes shown in the flow chart of FIG. 16.

On the other hand, if the intra-section browsing management server 22 decides to permit the access, the output-processing unit 222C creates image information that shows a list of data stored in the data storage unit 223. Then the output-processing unit 222C sends the image information to the client terminal 21, and makes its display-processing unit 215 display the data-list screen (step S44). In this data-list screen on the client terminal 21, users can choose data from those stored in the latest-data storing area 223A or in the approved data storing area 223B.

When data to display are chosen in the client terminal 21, the output-processing unit 222C sends various kinds of information, which is selected as described in the following paragraphs, to the client terminal 21, and makes its display-processing unit 215 display the information. By this procedure, users can select and look at the shape of components indicated by the 3-D shape data stored in the intra-section browsing management server 22, or the attribute information stored in the attribute management server 14.

Figure 18:
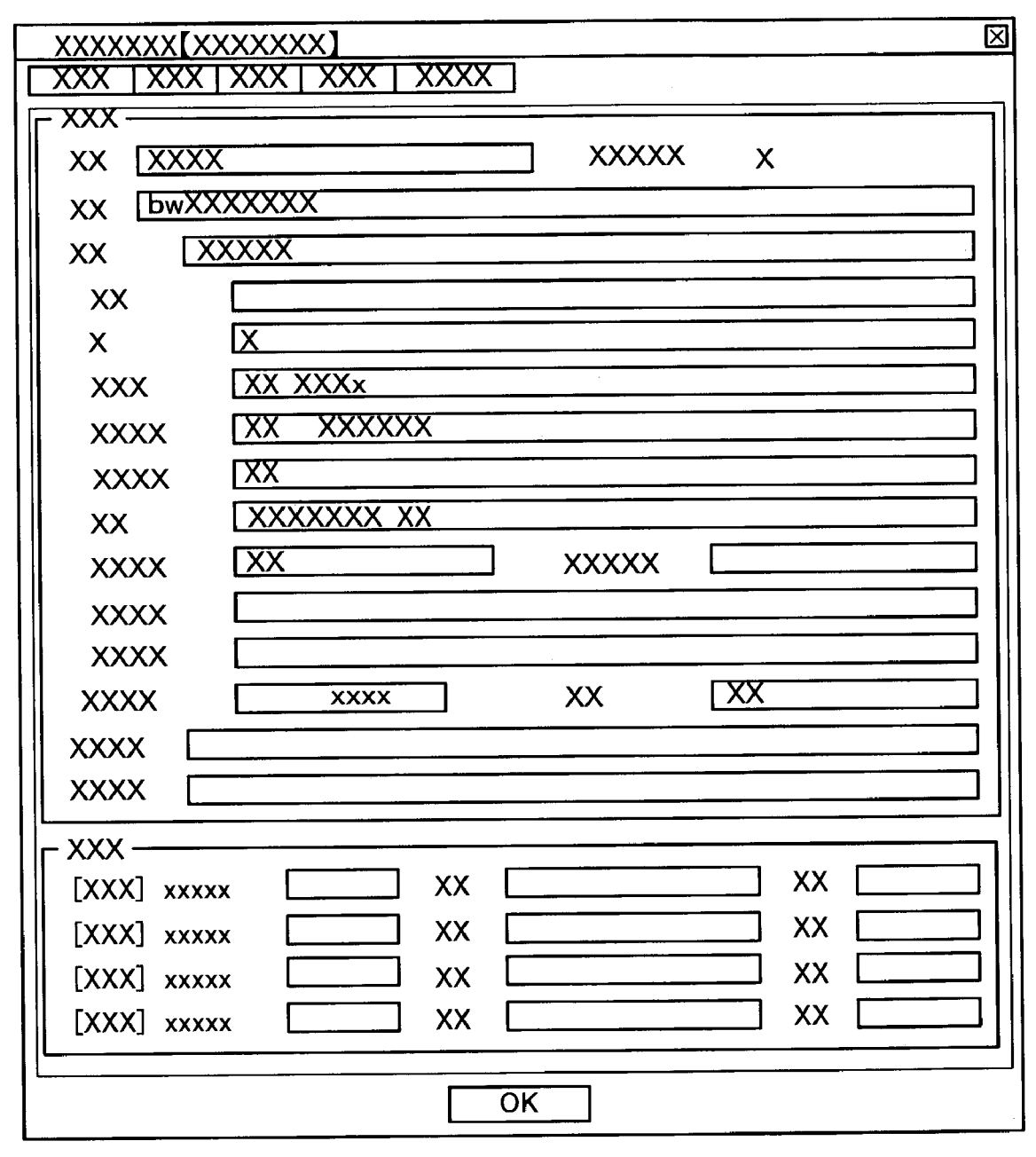
Figure 19:
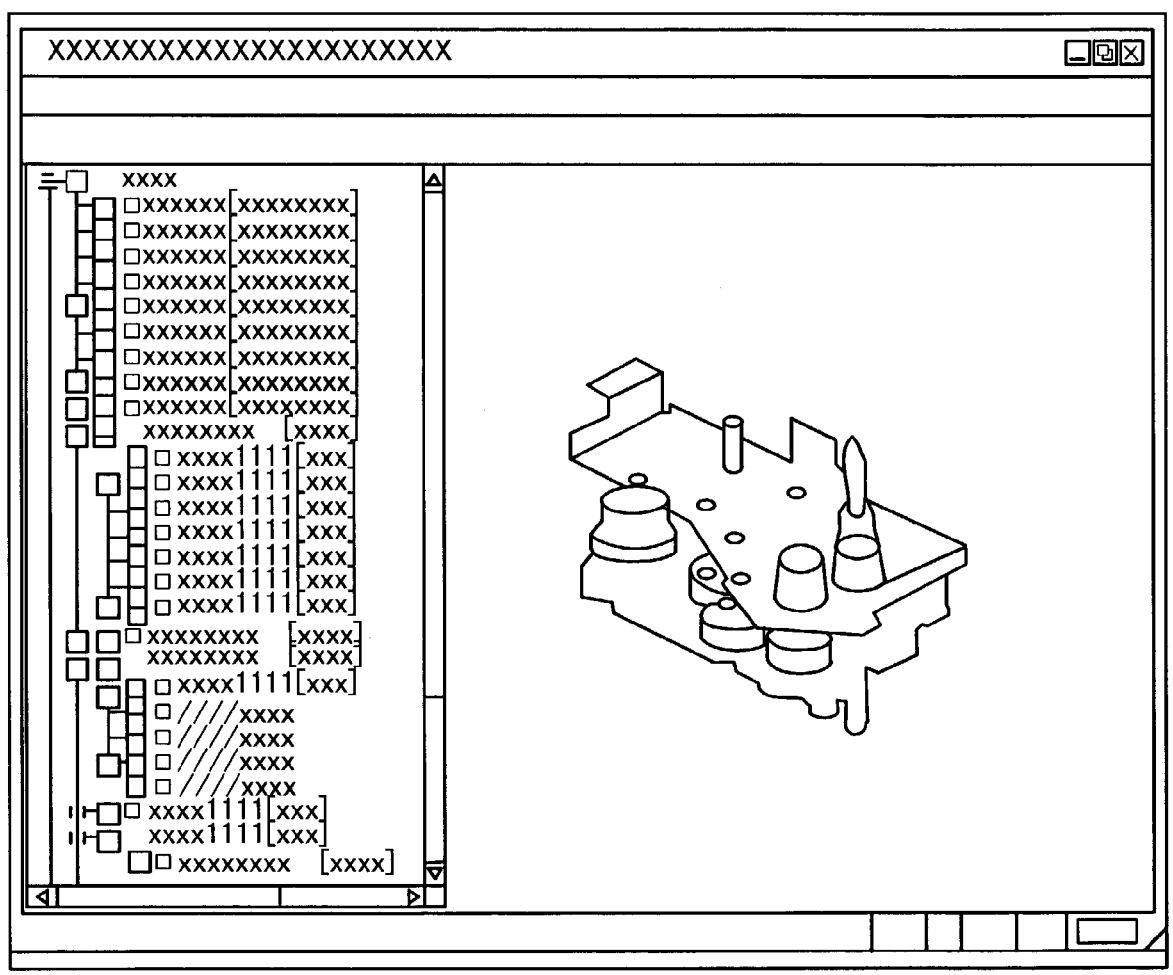
FIG. 19 shows an example of the 3-D shape browser.

More specifically, the output-processing unit 222C decides which information to output on the client terminal 21, according to the selection made by users (step S45). If the output-processing unit 222C decides that browsing of attribute information was selected at the client terminal 21 (attribute information at the step S45), it reads the corresponding attribute information from the attribute management server 14. Then the output-processing unit 222C displays the information on the client terminal 21, and enables users to look at the information (step S46). By this procedure, the display-processing unit 215 of the client terminal 21 shows browsing screen of attribute information, as shown in FIG. 18. On the other hand, if the output-processing unit 222C decides that the browsing of component shape was selected at the client terminal 21 (component shape at the step S45), it reads the corresponding 3-D shape data from the data storage unit 223. Then, it enables users to look at the information, by outputting it on the client terminal 21 (step S47). By this procedure, the display-processing unit 215 of the client terminal 21 shows browsing screen of component shape, as shown in FIG. 19.

The terminal-input processing unit 222E makes image information of a dialog box by which users can specify model name. Then it sends the information to the client terminal 21, and makes the terminal display it on the screen of the display-processing unit 215. When model names of units or products are specified on the client terminal 21, the output-processing unit 222C of the intra-section browsing management server 22 reads the 3-D shape data stored in the folder with the same as the model names. Then it outputs them sequentially to the client terminal 21, enabling users to browse them. Therefore, the output-processing unit 222C can display the 3-D shape data of the components used in the unit or product, including data of other components used in the corresponding component, on the client terminal 21. By this procedure, users can efficiently use the information shared by the browsing system provided by, e.g., the intra-section browsing management server 22.

In addition, when the client terminal 21 accesses the intra-section browsing management server 22, the server stores the following information in the history-storing area 223C: e.g. the recognition information of the accessing client terminal 21 (the information by which one can recognize difference among the client terminals $21_1$~$21_n$); access time; and the contents of process. By this procedure, the history-storing area 223C stores the history of accesses to the 3-D shape data stored in the data storage unit 223.

When a command is inputted at the client terminal 21 to copy the 3-D shape data stored in the intra-section browsing management server 22, the process control unit 222 of the server detects it. The process control unit 222 responds to the command to copy, and it adds the user ID, which is assigned by the permission-management unit 222A, to the 3-D shape data to be copied. For example, the process control unit 222 adds the user ID to the 3-D shape data, by ciphering the 3-D shape data with user ID. The output-processing unit 222C outputs the encrypted 3-D shape data to the client terminal 21, to which the copy command was inputted. The client terminal 21 deciphers the 3-D shape data with the user ID. These procedures protect the 3-D shape data from leaking to outsiders.

The components shape, which can be displayed on the client terminal 21 with 3-D shape data stored in the intra-section browsing management server 22 can be also displayed on the groupware by general browsing management server 23. The action for making it possible to display components shape on the general-browsing management server 23 will be described below. The intra-section browsing management server 22 responds to the command inputted, e.g. by the input-processing unit 224, and it carries out the processes shown in the flow chart of FIG. 20, in order to make it possible to send data to the general-browsing management server 23 and output them on the groupware. The process control unit 222 of the intra-section browsing management server 22 executes a program stored in the data storage unit 223 and it starts the processes shown in the flow chart of FIG. 20.

Figure 20:
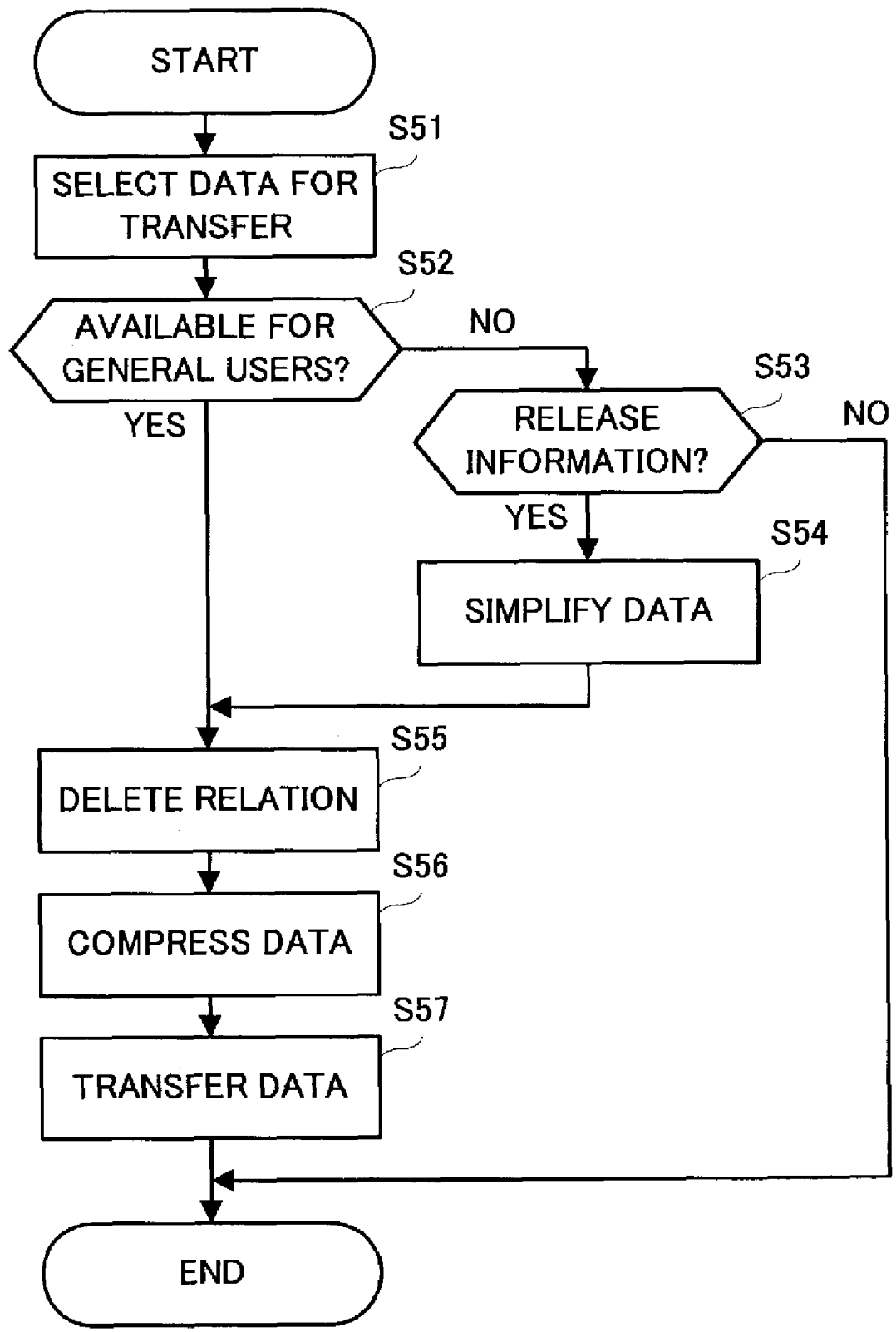
FIG. 20 is a flow chart showing the process that enables data to be transferred to the general-browsing management server and displayed on a groupware.

When the processes shown in the flow chart of FIG. 20 starts, the process control unit 222 makes it possible to select the data to be sent to the general-browsing management server 23 with the transfer-processing unit 222D. Specifically, in the transfer-processing unit 222D, the selection-input processing unit 222f, for example, makes the display-processing unit 225 display a dialog box, by which users can choose data for transfer by specifying assemblies or parts. Then, the selection-input processing unit 222F waits input from the input-processing unit 224. By inputting with the input-processing unit 224, users can select data for transfer (step S51).

When the data to be sent are selected, the selection-reading processing unit 222G searches the data storage unit 223 and reads the corresponding 3-D shape data. The selection-reading processing unit 222G determines if the 3-D shape data to be sent is available for general users, according to the attribute of file in which the 3-D shape data is stored, or according to the type of the 3-D shape data itself (step S52).

If the selection-reading processing unit 222G decides that the 3-D shape data must not be released, it makes the display-processing unit 225 show a screen for confirmation, and it asks the user if he/she wishes to release the data. The selection-reading processing unit 222G decides if it should release the information, according to the inputted information from the input-processing unit 224 (step S53). If the selection-reading processing unit 222g decides that the user does not release the data, it terminates the processes shown in the flow chart of FIG. 20. On the other hand, if the selection-reading processing unit 222G decides that the user releases the data, it simplifies the corresponding 3-D shape data, e.g. by changing the format of the data (step S54). More specifically, the data-deleting unit 222H deletes a part of the 3-D shape data. The deleted parts of the data include, for example, the recognition number to recognize the 3-D shape data, and the designer's name of the 3-D data. If the data is decided to be available for general users at the step S52, the steps S53 and S54 are skipped.

Using the relation-deleting unit 222I, the transfer-processing unit 222D deletes all the relations to the attribute information of the 3-D shape data to be sent (step S55). The 3-D shape data, whose relation to attribute information was deleted, is converted to a data suited for transfer by a compression process (step S56), and then transferred to the general-browsing management server 23 (step S57).

The general-browsing management server 23 stores the data sent from the intra-section browsing management server 22, in the data storage unit 233, and it enables the data to be outputted on groupware. The users of the information management system that is provided by the general-browsing management server 23 are given access permission in advance. The access permission is given, e.g. by the permission-management unit 232A of the process control unit 232, by setting each user's certification symbol. The permission-management unit 232A manages access permission independently of the permission-management unit 222A of the intra-section browsing management server 22 and it can set another set of certification symbols for each user. The permission-management unit 232A inherits the setting of access permission from the permission-management unit 222A of the intra-section browsing management server 22. Therefore, it enables the users of the browsing system provided by the intra-section browsing management server 22 to browse through information in the information management system provided by the general-browsing management server 23. Users can look at components shape with information system built on the groupware, by operating the input-processing unit 214 of the client terminal 21 to enter certification symbols that has user ID and password.

Figure 21:
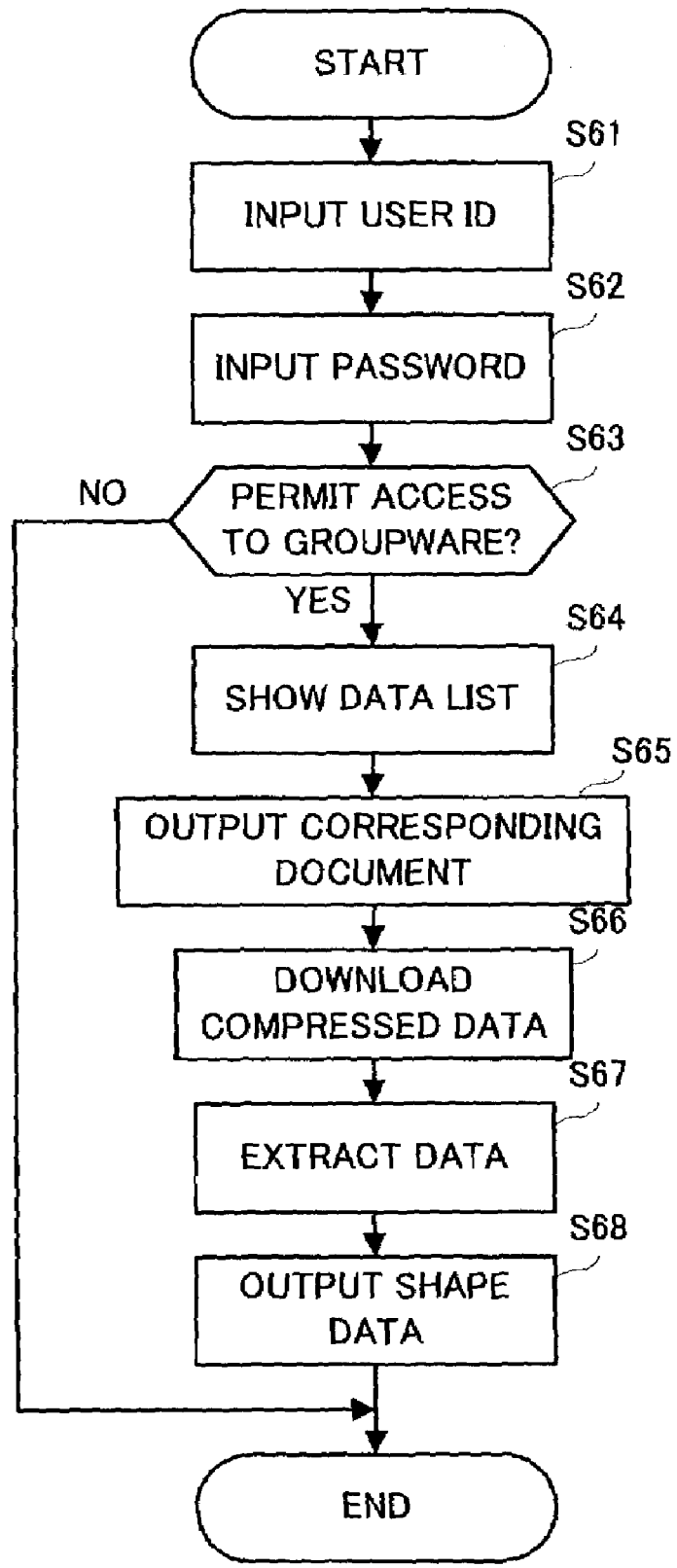
FIG. 21 is a flow chart showing the process that enables browsing of component shape on a groupware.

For example, when a command to start up the groupware on the client terminal 21 is inputted, the process control unit 232 of the general-browsing management server 23 runs a program, and starts the processes shown in the flow chart of FIG. 21.

When the processes shown in the flow chart of FIG. 21 starts, the process control unit 232 enables users to input information necessary for accessing the information system provided by the general-browsing management server 23 at the client terminal 21. Specifically, the process control unit 232 makes image information of a dialog box to enter user ID and password, which is similar to that of FIG. 17. Then the process control unit 232 sends the information to the client terminal 21 via the network 20 with the communication control unit 231, and makes the terminal display the information on the screen of the display-processing unit 215. On the client terminal 21, users can input their user ID and password by operating the input-processing unit 214. When a user ID is inputted (step S61) and a password is inputted (step S62), the inputted information is sent to the general-browsing management server 23 via the network 20.

When the general-browsing management server 23 receives the user ID and password sent from the client terminal 21, the process control unit 232 carries out the certification process with the certification-processing unit 232B, and it decides if it permits access to the groupware (step S63). If the process control unit 232 decides not to permit access, it terminates the processes shown in the flow chart of FIG. 21.

Figure 22A:
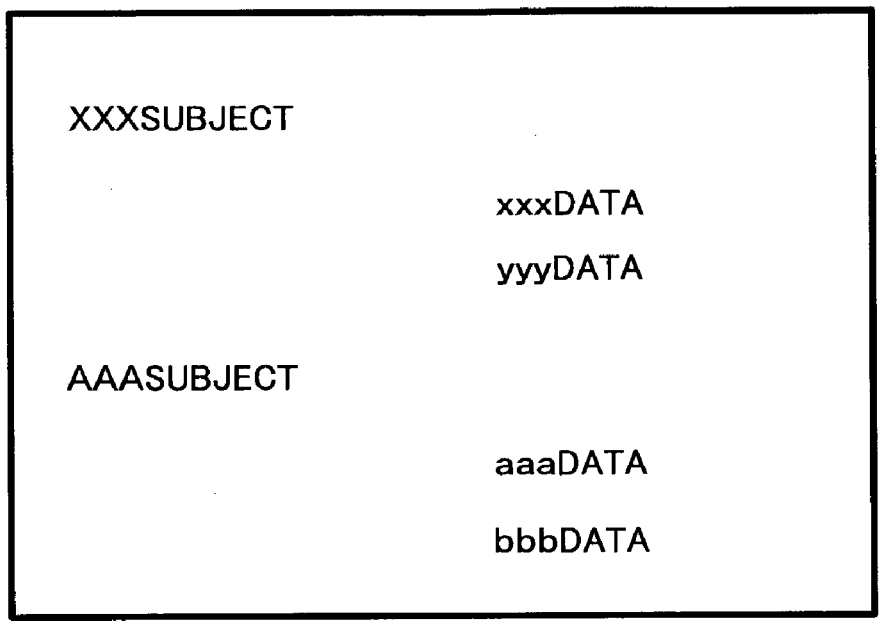
FIGS. 22A, 22B and 22C show examples of a list screen, a document screen, and a confirmation screen, respectively.

On the other hand, if the process control unit 232 decides to permit access, the output-processing unit 232C makes a list, for example, of data classified according to the subject of development based on the information stored in the data storage unit 233. Then it sends the list to the client terminal 21, and makes the display-processing unit 215 display the list screen as shown in FIG. 22A for example (step S64). In this list screen, users can select data to display at the client terminal 21, from those classified according to the subject of development.

Figure 22B:
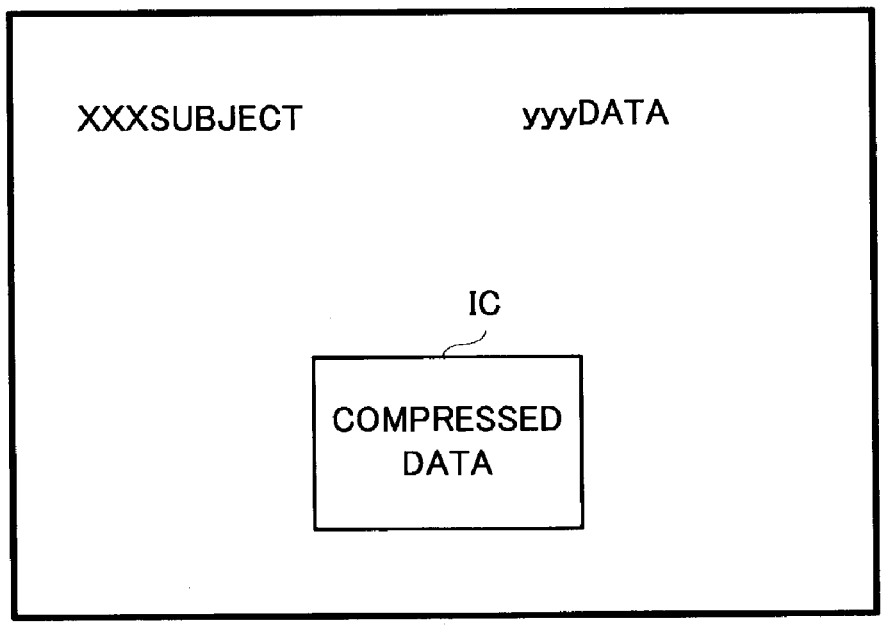

When data are selected at the client terminal 21, the output-processing unit 232C carries out processes, for example, reading documents corresponding to the selected data from the data storage unit 233, and sending them to the client terminal 21. By this procedure, a screen that shows documents managed on the groupware is displayed on the display-processing unit 215, and the document corresponding to the selected data is outputted for the user (step S65). FIG. 22B shows an example of the document screen. As shown in FIG. 22B, this document screen shows an icon IC that indicates the 3-D shape data stored in the data storage unit 233 in a compressed format. At the client terminal 21, users can command to select the 3-D shape data, by clicking the icon IC with the input-processing unit 214.

Figure 22C:
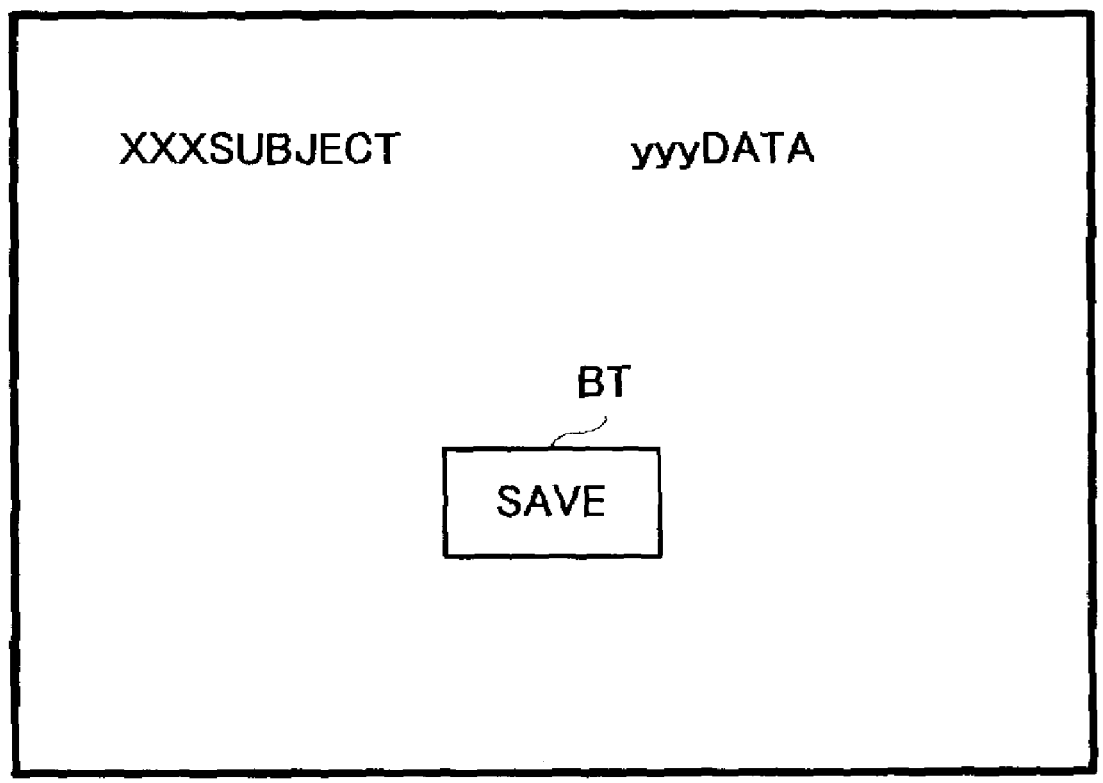

When the selecting of the 3-D shape data is commanded on the client terminal 21, the output-processing unit 232C makes image information that has a button for commanding to download. Then the output-processing unit 232C sends the information to the client terminal 21, and it makes the display-processing unit 215 show the confirmation screen as shown in FIG. 22C for example. When the command to download is inputted to the client terminal 21, the output-processing unit 232C reads the corresponding 3-D shape data from the data storage unit 233 in the compressed format, and it sends the data to the client terminal 21, making it downloaded (step S66).

The client terminal 21 that downloaded the compressed 3-D shape data responds to commands e.g. inputted with the input-processing unit 214 for extracting the data (step S67). Then it displays the extracted data on the display-processing unit (step S68), by which users can look at the data. By this procedure, the 3-D shape browser screen similar to that of FIG. 19 is displayed on the client terminal 21, based on the compressed 3-D shape data managed on the groupware.

As described above, by the present invention, 3-D CAD data that are created by the 3-D CAD system are converted to 3-D shape data by the conversion-processing device 13. Then the 3-D shape data can be shared by being displayed by the intra-section browsing management server 22. When the model name of a unit or a product is specified in the client terminal 21, the intra-section browsing management server 22 finds the 3-D shape data stored in a folder, whose name is the same as the model name. Then it displays the 3-D shape data on the client terminal 21, making it possible to look at the data. By this procedure, users can use the shared information efficiently.

In addition, the 3-D shape data stored in the intra-section browsing management server 22 can be outputted on the client terminal 21 with its access permission being managed. When making 3-D shape data looked at by general users whose access permission is managed on the groupware, the 3-D shape data stored in the intra-section browsing management server 22 are simplified by compression, and they are stored in the general-browsing management server 23. Since the general-browsing management server 23 manages access permission independently of the intra-section browsing management server 22, it can manage access permission properly and secure the information provided by the information browsing system 2.

Besides, when current time is past a time stored in advance, the CAD management server 12 sends the following two kinds of data to the conversion-processing device 13: the 3-D CAD data that is not converted to the 3-D shape data; and the 3-D CAD data whose registration date is past the conversion date. Then, the CAD management server 12 makes them converted to the 3-D shape data. In addition, the 3-D CAD data that is approved as valid data can be sent to the conversion-processing device 13, and converted to the 3-D shape data.

By this procedure, the 3-D CAD data that is created by the 3-D CAD system can be efficiently converted to 3-D shape data and shared in the information browsing system 2. Besides, it is possible to make little difference between the shape of components that are shown by 3-D CAD data created by the 3-D CAD system 1, and that browsed on the information browsing system 2. Therefore, consistency of information provided by each system can be maintained.

The present invention is not limited to the above embodiment of it, and various modifications and applications are feasible. For example, various devices installed in the 3-D CAD system 1 and the information browsing system 2 can be a server that integrates multiple functions, or multiple servers with each server co-operatively functioning. The devices mentioned above include: e.g., the CAD management server 12, the conversion-processing device 13, the attribute management server 14, the intra-section browsing management server 22 and the general-browsing management server 23. In addition, the structures of the database and the storage area are not limited to the ones described above. For example, two or more databases or storage area can be integrated into one functional unit, or a databases or storage area can be divided into more than two functional units. Each database or storage area can be realized by storing data, e.g., in magnetic disks installed outside of server.

It is also possible that a computer or multiple computers are configured as the system described above. Besides, whole or a part of the programs necessary to carry out the processes described above can be stored in various kinds of media (such as IC memories, magnetic disks, optical disks, magneto-optical disks, and magnetic tapes). Then, those computers or media can be distributed.

According to the present invention, 3-D shape data can be made and outputted by conversion of 3-D CAD data that is created by the 3-D CAD system, and the shared information can be used efficiently.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modification made within the meaning of an equivalent of the claims of the invention and within the claims are to be regarded to be in the scope of the present invention. This application is based on the Japanese Patent Application Nos. 2001-387466, 2001-387448 and 2001-387435, filed on Dec. 20, 2001 and including specification, claims, drawings and summary. The disclosure of the above Japanese Patent Applications is incorporated herein by reference in its entirety.

What is claimed is:

1. A conversion processing device, comprising:
a data memory storing drafting data,
a selector configured to choose said drafting data stored in the data memory,
a converter configured to convert said drafting data chosen by the selector into shape data,
a transmitter configured to transmit said shape data obtained by the conversion by said converter, to a browsing management server that stores said shape data and enables browsing said shape data via a communication network;
a time memory storing a time set up in advance,
wherein said converter converts said drafting data into said shape data when current time is after said time stored in said time memory,
wherein said selector determines if there is any drafting data yet to be converted into the shape data, in the drafting data stored in the data memory, and when the determination is that there is drafting data yet to be converted, the selector selects a first drafting data yet to be converted.

2. The conversion processing device according to claim 1 wherein said drafting data is 3-Dimensional computer aided design data, and said shape data is 3-Dimensional shape data showing parts of a product.

3. The conversion processing device according to claim 1 wherein said selector selects said drafting data using recognition information including parts-number to be associated with: parts under design; other parts to use in said parts under design, said other parts already having been designed prior to the designing of said parts under design; a unit or a product in which said parts under design and other parts are used.

4. The conversion processing device according to claim 3, wherein said recognition information includes the parts number associated with said shape data for a product, and designer's name associated with said shape data.

5. The conversion processing device according to claim 4, wherein said browsing management server determines whether or not to permit browsing of drafting data via said communication network based on access rights provided to each user in advance, and, when determining to permit browsing, deletes said parts number and said designer's name of said drafting data to enable browsing of drafting data by a client terminal.

6. The conversion processing device of claim 3, comprising:
a confirmation unit configured to confirm access information for accessing said browsing management server.

7. The conversion processing device of claim 6, wherein the converter converts said drafting data into said shape data according to recognition information associated with the selector, and the transmitter distributes said shape data after said confirmation unit confirms access information.

8. The conversion processing device according to claim 1, wherein said selector has a receiving unit to receive said drafting data which said converter converts into said shape data from said browsing management server.

9. A browsing management method for 3-Dimensional (3-D) shape data, comprising the steps of:
comparing current time with a preset time stored in memory;
converting a 3-D Computer Aided Design (CAD) data which is stored in said memory into said 3-D shape data when said current time is after said preset time stored in said memory; and
providing said 3-D shape data to a client apparatus connected via a communication network.

10. A computer-readable recording medium storing a 3-Dimensional (3-D) shape data browsing program executed in a device for browsing the shape data that includes multiple client devices and a communications network, said browsing program comprising computer instructions for causing the device to perform:
comparing current time with a preset time stored in memory;
converting said 3-D CAD data into 3-D shape data when said current time is after said preset time; and
providing the 3-D shape data to a client apparatus connected via a communication network.

11. A browsing management server that obtains, from a conversion processing device which converts 3-Dimensional (3-D) Computer Aided Design (CAD) data into 3-D shape data, said 3-D shape data via communications network, and enables browsing said 3-D shape data through a client apparatus connected to said communications network, comprising:
approving unit configured to approve said 3-D CAD data as valid data;
first memory configured to store said 3-D shape data which is formed by said conversion processing device and is not approved as valid data,
second memory configured to store said 3-D shape data which is formed by said conversion device and is approved as valid data,
time measurement unit configured to count time;
storing time memory configured to store time set up in advance;
time, comparing unit configured to compare a time counted by said time measurement device with said time stored in said storing time memory;
a control unit configured to control said conversion processing device to convert said 3-D CAD data into said 3-D shape data, obtain said 3-D shape data obtained by the conversion, and store said obtained 3-D shape data in said first or second memory, in a case where the comparison of said time comparing unit revealed that a current time has passed said time set up in advance;
a providing unit configured to provide said 3-D shape data stored in said first or said second memory to said client apparatus.

12. The browsing management server according to claim 11 further including:
a receiving unit configured to receive a request for an approval as valid data for said 3-D CAD data from said client apparatus;
wherein said control unit acquires said request from said receiving unit, controls said conversion processing device to convert said 3-D CAD data approved as authorized data by said approving unit into said 3-D shape data, and stores obtained 3-D shape data into said second memory.

13. The browsing management server according to claim 12 further including:
an attribute information memory configured to store attribute information of said each 3-D shape data formed by said conversion processing device; and
wherein the receiving unit is configured to receive a request for attribute information;
wherein the control unit is configured to control the conversion processing device so that said 3-D CAD data is shown upon said request for attribute information;
wherein said providing unit is configured to provide said attribute information of each said 3-D shape data stored in said attribute information memory to said client apparatus according to said request for attribute information,
wherein said attribute information of each said 3-D shape data is shown at said client apparatus upon said request for attribute information.

14. The browsing management server according to claim 11
wherein said first and second memories are provided with each of a plurality of server devices connected via said communication network, and further comprises:
a distributing unit configured to distribute said 3-D shape data formed by said conversion processing device, to any one of said plurality of server devices.

15. A browsing managing method executed in a 3-Dimensional (3-D) Computer Aided Design (CAD) system that enables browsing 3-D shape data through a client apparatus connected via a communication network, the method comprising the steps of:
storing said 3-D CAD data formed by said 3-D CAD system in a data memory,
comparing current time with a preset time in a time memory,
approving said 3-D CAD data stored in said data memory as a valid data,
converting said 3-D CAD data which is stored in said data memory and approved as a valid data into 3-D shape data when the current time is after said preset time in said time memory, and
providing the 3-D shape data to said client apparatus.

16. A storage medium that stores therein a program which when executed in a 3-Dimensional (3-D) Computer Aided Design (CAD) system enables browsing 3-D shape data through a client apparatus connected via a communications network, said program comprising computer readable instructions to cause the computer to:
compare current time with a preset time stored in a time memory,
store said 3-D CAD data formed by said 3-D CAD system in a data memory, approve said 3-D CAD data stored in said data memory as a valid data, convert said 3-D CAD data which is stored in said data memory and approved as a valid data into a 3-D shape data when the current time is after said preset time stored in said time memory, and provide said 3-D shape data to said client apparatus.

17. A system that enables browsing 3-dimensional (3-D) Computer Aided design (CAD) data through a client apparatus connected via a communication network, comprising:

a data memory configured to store said 3-D CAD data formed by a 3-D CAD system, a comparing unit configured to compare current time with a preset time in a time memory, an approving unit configured to approve said 3-D CAD data stored in said data memory as a valid data, a converting unit configured to convert said approved 3-D CAD data into 3-D shape data when the current time is after said preset time in said time memory, and a providing unit configured to provide the 3-D shape data to said client apparatus.

* * * * *